US010720080B1

(12) United States Patent
Fields et al.

(10) Patent No.: US 10,720,080 B1
(45) Date of Patent: Jul. 21, 2020

(54) SYSTEM AND METHOD FOR DETERMINING A QUALITY OF DRIVING OF A VEHICLE

(71) Applicant: STATE FARM MUTUAL AUTOMOBILE INSURANCE COMPANY, Bloomington, IL (US)

(72) Inventors: Brian Mark Fields, Normal, IL (US); Nicholas R. Baker, Normal, IL (US); Lee Marvin John Assam, El Paso, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 363 days.

(21) Appl. No.: 15/218,965

(22) Filed: Jul. 25, 2016

Related U.S. Application Data

(60) Provisional application No. 62/256,799, filed on Nov. 18, 2015.

(51) Int. Cl.
| | |
|---|---|
| *G09B 19/00* | (2006.01) |
| *G09B 19/16* | (2006.01) |
| *G07C 5/00* | (2006.01) |
| *G07C 5/08* | (2006.01) |
| *B60Q 9/00* | (2006.01) |
| *G09B 19/14* | (2006.01) |
| *G06Q 40/08* | (2012.01) |

(52) U.S. Cl.
CPC ............ *G09B 19/167* (2013.01); *B60Q 9/00* (2013.01); *G06Q 40/08* (2013.01); *G07C 5/008* (2013.01); *G07C 5/085* (2013.01); *G09B 19/14* (2013.01)

(58) Field of Classification Search
CPC ........ G09B 19/16; G09B 19/14; G09B 9/042; G09B 9/052; G07C 5/00; G07C 5/08; B60Q 9/00; G06Q 40/08
See application file for complete search history.

(56) References Cited

U.S. PATENT DOCUMENTS

| | | | | |
|---|---|---|---|---|
| 6,679,702 B1 * | 1/2004 | Rau | ......................... | G09B 9/02 340/435 |
| 7,680,749 B1 * | 3/2010 | Golding | ............. | G01C 21/3484 706/14 |
| 8,907,772 B1 * | 12/2014 | Green | ................... | G07C 5/008 340/438 |

(Continued)

*Primary Examiner* — Eddy Saint-Vil
(74) *Attorney, Agent, or Firm* — Marshall, Gerstein & Borun LLP

(57) ABSTRACT

A computer-implemented method for determining a quality of driving of a vehicle is presented. Information indicating at least one driving condition may be received from at least one driving condition information indicating device. The at least one driving condition may be different from each of a plurality of driving metrics, and may affect a relationship between the quality of driving and at least one of the plurality of driving metrics. Information indicating the at least one driving metric may be received. At least one indication of the quality of driving of the vehicle may be determined based on the information indicating the at least one driving metric and the received information from the at least one driving condition information indicating device. The at least one indication of the quality of driving may be provided to at least one of the driver, a driving instructor, or an insurance provider.

19 Claims, 8 Drawing Sheets

(56) References Cited

U.S. PATENT DOCUMENTS

| | | | | |
|---|---|---|---|---|
| 9,147,353 B1* | 9/2015 | Slusar | | G09B 19/167 |
| 9,373,203 B1* | 6/2016 | Fields | | G07C 5/12 |
| 9,892,573 B1* | 2/2018 | Hsu-Hoffman | | G07C 5/085 |
| 2004/0139034 A1* | 7/2004 | Farmer | | G06Q 30/0283 |
| | | | | 705/400 |
| 2005/0137757 A1* | 6/2005 | Phelan | | G01M 17/00 |
| | | | | 701/1 |
| 2008/0255888 A1* | 10/2008 | Berkobin | | G06Q 40/08 |
| | | | | 705/4 |
| 2010/0087984 A1* | 4/2010 | Joseph | | G09B 9/052 |
| | | | | 701/31.4 |
| 2010/0207787 A1* | 8/2010 | Catten | | G06F 17/30241 |
| | | | | 340/905 |
| 2010/0211270 A1* | 8/2010 | Chin | | B60W 40/09 |
| | | | | 701/44 |
| 2011/0063099 A1* | 3/2011 | Miller | | G07C 5/085 |
| | | | | 340/439 |
| 2012/0021386 A1* | 1/2012 | Anderson | | G09B 9/042 |
| | | | | 434/66 |
| 2012/0068858 A1* | 3/2012 | Fredkin | | G08G 1/096741 |
| | | | | 340/902 |
| 2012/0123806 A1* | 5/2012 | Schumann, Jr. | | G06Q 40/08 |
| | | | | 705/4 |
| 2012/0197669 A1* | 8/2012 | Kote | | G06Q 10/10 |
| | | | | 705/4 |
| 2012/0209505 A1* | 8/2012 | Breed | | G01C 21/3697 |
| | | | | 701/409 |
| 2013/0073112 A1* | 3/2013 | Phelan | | G06Q 40/00 |
| | | | | 701/1 |
| 2013/0164715 A1* | 6/2013 | Hunt | | G09B 19/167 |
| | | | | 434/65 |
| 2013/0179198 A1* | 7/2013 | Bowne | | G06Q 40/08 |
| | | | | 705/4 |
| 2013/0297097 A1* | 11/2013 | Fischer | | G06F 17/00 |
| | | | | 701/1 |
| 2013/0317665 A1* | 11/2013 | Fernandes | | G08G 5/0039 |
| | | | | 701/1 |
| 2014/0278574 A1* | 9/2014 | Barber | | B60W 40/09 |
| | | | | 705/4 |
| 2015/0081399 A1* | 3/2015 | Mitchell | | G06Q 10/0639 |
| | | | | 705/7.38 |
| 2015/0294547 A1* | 10/2015 | Ito | | B60K 28/06 |
| | | | | 340/576 |
| 2017/0053554 A1* | 2/2017 | Nalepka | | G09B 19/167 |
| 2017/0053555 A1* | 2/2017 | Angel | | G09B 19/167 |
| 2017/0263061 A1* | 9/2017 | Mann | | G07C 5/0808 |

\* cited by examiner

400

┌─────────────────────────────────────────────────────────────────────┐
│ DETERMINE AT LEAST ONE GRADATION OF QUALITY OF DRIVING OF VEHICLE   │
└─────────────────────────────────────────────────────────────────────┘
                                    ↓ ↖ 402
┌─────────────────────────────────────────────────────────────────────┐
│ PROVIDE, TO DRIVER AND/OR DRIVING INSTRUCTOR, AT LEAST ONE OF: (I)  │
│ ABILITY TO REVIEW ALL OF DRIVING OF VEHICLE DURING PARTICULAR TRIP, │
│ OR (II) ABILITY TO SELECT ONE OR MORE SEGMENTS OF PARTICULAR TRIP   │
│      WITH RESPECT TO WHICH TO REVIEW DRIVING OF VEHICLE             │
└─────────────────────────────────────────────────────────────────────┘
                                    ↓ ↖ 404
┌─────────────────────────────────────────────────────────────────────┐
│ PROVIDE ABILITY TO REVIEW, AT DIFFERENT TIMES DURING AT LEAST ONE   │
│ OF ALL OF DRIVING OF VEHICLE OR ONE OR MORE SELECTED SEGMENTS,      │
│ THE AT LEAST ONE DRIVING METRIC AND/OR AT LEAST A PORTION OF THE    │
│    INFORMATION INDICATING THE AT LEAST ONE DRIVING CONDITION        │
└─────────────────────────────────────────────────────────────────────┘
                                       ↖ 406

*FIG. 4*

SYSTEM AND METHOD FOR DETERMINING A QUALITY OF DRIVING OF A VEHICLE

CROSS-REFERENCE TO RELATED APPLICATION

This application claims the benefit of U.S. Provisional Patent Application No. 62/256,799, entitled "System and Method for Determining a Quality of Driving of a Vehicle," filed on Nov. 18, 2015, the disclosure of which is hereby incorporated herein by reference.

FIELD OF THE DISCLOSURE

The present disclosure generally relates to information associated with vehicle driving and, more particularly, to a system and method for determining a quality of driving of a vehicle.

BACKGROUND

A driver and/or a driving instructor may assess driving of a vehicle during a driving trip by visually checking the speedometer reading of the vehicle. However, this type of check may be difficult for the driving instructor to perform from a passenger seat. Additionally, this type of check and other conventional techniques for assessing driving of a vehicle provide a limited amount of information regarding the driving of the vehicle.

Furthermore, checking the speedometer of the vehicle during driving only provides information regarding a particular speed at a particular time. Other conventional techniques for assessing driving of a vehicle also provide minimal flexibility in the ways in which information regarding the driving of the vehicle may be provided.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method for determining a quality of driving of a vehicle may be provided. The method may include receiving, using one or more processors via a computer network, from at least one driving condition information indicating device, information indicating at least one driving condition. The at least one driving condition may be different from each of a plurality of driving metrics associated with the driving of the vehicle, and may affect a relationship between the quality of the driving of the vehicle and at least one driving metric of the plurality of driving metrics associated with the driving of the vehicle. The method may also include receiving, using the one or more processors, information indicating the at least one driving metric associated with the driving of the vehicle. The method may additionally include determining, using the one or more processors, at least one indication of the quality of the driving of the vehicle based on the information indicating the at least one driving metric and based on the received information from the at least one driving condition information indicating device. The method may further include providing, using the one or more processors, the at least one indication of the quality of the driving of the vehicle to at least one of the driver, a driving instructor present in the vehicle during the driving of the vehicle by the driver, or an insurance provider providing insurance coverage with respect to at least one of the vehicle or the driver.

In another embodiment, a computer device for determining a quality of driving of a vehicle may be provided. The computer device may include one or more processors and one or more memories coupled to the one or more processors. The one or more memories may include non-transitory computer executable instructions stored therein that, when executed by the one or more processors, cause the one or more processors to receive, from at least one driving condition information indicating device, information indicating at least one driving condition. The at least one driving condition may be different from each of a plurality of driving metrics associated with the driving of the vehicle, and may affect a relationship between the quality of the driving of the vehicle and at least one driving metric of the plurality of driving metrics associated with the driving of the vehicle. The non-transitory computer executable instructions, when executed by the one or more processors, may also cause the one or more processors to receive information indicating the at least one driving metric associated with the driving of the vehicle. The non-transitory computer executable instructions, when executed by the one or more processors, may additionally cause the one or more processors to determine at least one indication of the quality of the driving of the vehicle based on the information indicating the at least one driving metric and based on the received information from the at least one driving condition information indicating device. The non-transitory computer executable instructions, when executed by the one or more processors, may further cause the one or more processors to provide the at least one indication of the quality of the driving of the vehicle to at least one of the driver, a driving instructor present in the vehicle during the driving of the vehicle by the driver, or an insurance provider providing insurance coverage with respect to at least one of the vehicle or the driver.

In yet another embodiment, a computer readable storage medium may be provided that includes non-transitory computer readable instructions stored thereon for determining a quality of driving of a vehicle. The instructions, when executed on one or more processors, may cause the one or more processors to receive, from at least one driving condition information indicating device, information indicating at least one driving condition. The at least one driving condition may be different from each of a plurality of driving metrics associated with the driving of the vehicle, and may affect a relationship between the quality of the driving of the vehicle and at least one driving metric of the plurality of driving metrics associated with the driving of the vehicle. The instructions, when executed on the one or more processors, may also cause the one or more processors to receive information indicating the at least one driving metric associated with the driving of the vehicle. The instructions, when executed on the one or more processors, may additionally cause the one or more processors to determine at least one indication of the quality of the driving of the vehicle based on the information indicating the at least one driving metric and based on the received information from the at least one driving condition information indicating device. The instructions, when executed on the one or more processors, may further cause the one or more processors to provide the at least one indication of the quality of the driving of the vehicle to at least one of the driver, a driving instructor present in the vehicle during the driving of the vehicle by the driver, or an insurance provider providing insurance coverage with respect to at least one of the vehicle or the driver.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 4 is a flow chart of another example method, routine, or process for determining a quality of driving of a vehicle;

Figure 1:
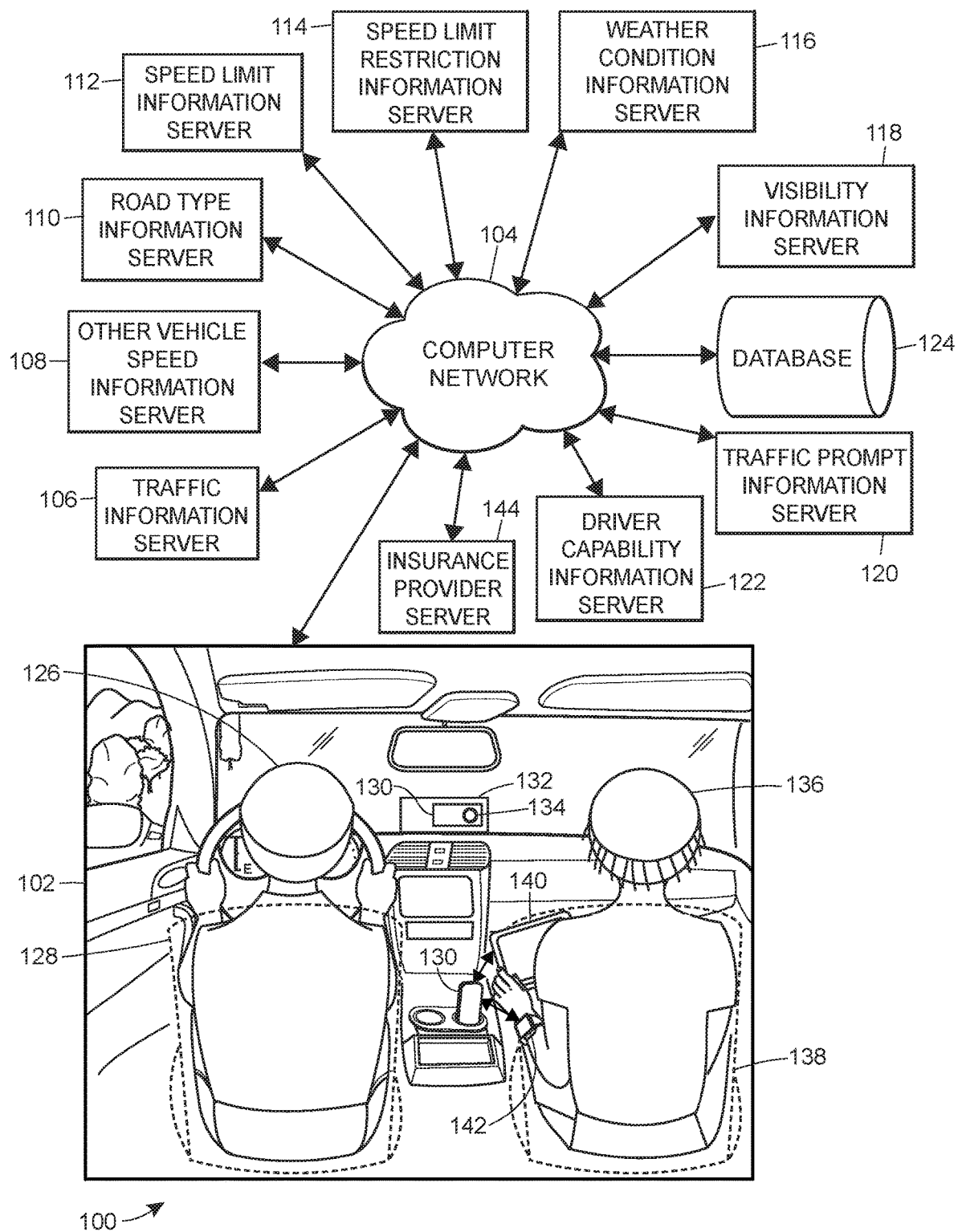
FIG. 1 illustrates an example system for determining a quality of driving of a vehicle.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

I. Example Determining of a Quality of Driving of a Vehicle

The present embodiments relate to, inter alia, a system and method for determining a quality of driving of a vehicle. More particularly, information indicating at least one driving condition may be received from at least one driving condition information indicating device. The at least one driving condition information indicating device may be or may include, for example, a traffic information server; an other vehicle speed information server; a road type information server; a speed limit information server; a speed limit restriction information server; a weather condition information server; a visibility information server; a traffic prompt information server; and/or a driver capability information server. The at least one driving condition information indicating device may also or alternatively include other suitable device(s) such as one or more databases, and one or more servers described above as being different types of servers may be implemented in the same server or other suitable device.

The at least one driving condition may be different from each of a plurality of driving metrics associated with the driving of the vehicle, and more particularly may be a condition associated with one of the example server types noted above (e.g., traffic, speed of other vehicles, road type, etc.). The at least one driving condition may affect a relationship between the quality of the driving of the vehicle and at least one driving metric of the plurality of driving metrics. The plurality of driving metrics may include, for example, one or more of a speed of the vehicle, a distance between the vehicle and another vehicle in front of the vehicle, or a degree of braking applied by the driver, as more fully described below.

Information may be received indicating the at least one driving metric, and at least one indication of the quality of the driving of the vehicle may be determined based on the information indicating the at least one driving metric and based on the received information from the at least one driving condition information indicating device. The at least one indication of the quality of the driving of the vehicle may include, for example, one or more of whether a speed of the driving of the vehicle exceeds a speed limit, an amount by which the speed limit is exceeded, how long the speed limit is exceeded, or a variation in a speed of the driving of the vehicle, as more fully described below.

The at least one indication of the quality of the driving of the vehicle may be provided to at least one of the driver, a driving instructor present in the vehicle during the driving of the vehicle, or an insurance provider providing insurance coverage with respect to at least one of the vehicle or the driver. For example, the at least one indication of the quality of the driving may be provided via a user interface of a mobile phone executing an application that allows the features described above to be implemented. For ease of viewing or otherwise noting the at least one indication of the quality of the driving, the at least one indication of the quality of the driving may also or alternatively be provided to the driving instructor via a user interface of another mobile device in the vehicle, such as a tablet or a smartwatch in the possession of (e.g., worn by, in the case of a smartwatch) the driving instructor. The driving instructor may thus receive information regarding the quality of the driving that is viewable or otherwise accessible to the driving instructor only, and the driving instructor may instruct the driver (e.g., student driver) of the vehicle accordingly.

The at least one indication of the quality of the driving of the vehicle may be determined by determining at least one gradation of the quality of the driving, where each one of the at least one gradation may indicate the quality of the driving of the vehicle relative to the quality of the driving of the vehicle as indicated by a different gradation.

The at least one indication of the quality of the driving of the vehicle may be provided to the at least one of the driver, the driving instructor, or if desired, the insurance provider, on a map and/or by way of other suitable output indicating parameters such as actual speed, speed limit, quality metric(s) such as a determined score reflecting the at least one indication of the quality of the driving of the vehicle, etc. The at least one indication of the quality of the driving of the vehicle may be provided by, among other possible actions, providing a coded map that indicates different gradations of the quality of the driving at different points during an overall trip. For example, a red segment of the trip may indicate a poorest quality of driving, and a green segment of the trip may indicate a highest quality of driving. The at least one of the driver, the driving instructor, or the insurance provider may review the at least one indication of the quality of the driving for the entire trip or for one or more selected segments of the trip as described in further detail below.

When the at least one indication of the quality of the driving of the vehicle is provided to the insurance provider, the insurance provider may determine an adjustment to at least one of a rating and/or a premium to apply to the insurance coverage provided by the insurance provider. Such an adjustment may be determined, for example, when the at least one indication of the quality of the driving of the vehicle is provided to the insurance provider outside of a student driving situation (e.g., when only the driver and no driving instructor is present in the vehicle).

By providing a system and method that allow determining a quality of driving of a vehicle as described above and further detailed below, various advantages are achieved. For example, in view of the receipt of information indicating the at least one driving condition from the at least one driving condition information indicating device, the system and method provide and/or are implemented through the use of a device(s) that provide information particularly suited for use in concert/in conjunction with other features of the system and method to determine at least one indication of the quality of the driving of the vehicle. More particularly, for example, the information provided using the at least one driving condition information indicating device may affect a relationship between the quality of the driving of the vehicle and at least one driving metric associated with the driving of the vehicle. Thus, for at least this reason, such information provided using the at least one driving condition information indicating device may be particularly suited for use in determining the at least one indication of the quality of the driving of the vehicle. The at least one indication of the quality of the driving of the vehicle may then be advantageously provided in any of a number of suitable ways in greater detail and/or in a more usable form as compared to conventional methods, as further described below. As such, the inclusion of at least the receipt of information indicating the at least one driving condition from the at least one driving condition information indicating device improves upon the nature of determining a quality of driving of a vehicle. Other advantages will be recognized by one of ordinary skill in the art in light of the teaching and disclosure herein.

II. Example System and Related Functionality

FIG. 1 illustrates an example system 100 for determining a quality of driving of a vehicle. The example system 100 may include a vehicle 102, a computer network 104, and at least one driving condition information indicating device. As shown in the example of FIG. 1, the at least one driving condition information indicating device may be implemented as a number of servers, although other devices (such as, but not limited to, databases) may be used, a single device may implement all of the functionality of multiple driving condition information indicating devices, etc. More particularly, in the example of FIG. 1, the at least one driving condition information indicating device may include a traffic information server 106, an other vehicle speed information server 108, a road type information server 110, a speed limit information server 112, a speed limit restriction information server 114, a weather condition information server 116, a visibility information server 118, a traffic prompt information server 120, and/or a driver capability information server 122. Each of the servers 106-122 may be communicatively coupled to the computer network 104.

The example system 100 may also include one or more driving quality information databases, driving condition information databases, and/or driving metric information databases, and/or other data storage mechanisms (e.g., one or more hard disk drives, optical storage drives, solid state storage devices, etc.), shown collectively in the example of FIG. 1 as a single database 124 communicatively coupled to the computer network 104. The database(s) 124 may store data related to driving conditions, driving metrics, and/or quality of driving, where quality of driving may be determined as described herein.

The computer network 104 may be a computer network of an insurance provider (e.g., provided or used by the insurance provider or communications over which the insurance provider otherwise controls or facilitates). The computer network 104 may also be communicatively coupled to the vehicle 102. The vehicle 102 may include a driver 126 seated in a driver seat 128, and a mobile phone or other mobile device (e.g., a smart phone, a tablet, a phablet, or any suitable mobile device) 130 which may be located in a cup holder of the vehicle 102 as shown in FIG. 1. The mobile device 130 may execute computer-executable instructions, such as a mobile application, that allow the actions described herein to be implemented.

The example of FIG. 1 also shows a dashboard mount 132, which may serve in some embodiments as an alternative location for the mobile device 130 during a particular driving trip of the vehicle 102. As shown in the illustration of the mobile device 130 being secured in the dashboard mount 132, the mobile device 130 may include a camera 134, which may be used to obtain information as described below. The vehicle 102 may also include a driving instructor 136 or other passenger seated in a passenger seat 138. In some embodiments, the driving instructor 136 may hold a computing device 140, such as a computing device with a user interface, which may be communicatively coupled to the mobile device 130 so that the driving instructor 136 may receive information regarding, for example, the quality of the driving as further discussed below. The computing device 140, and each of the computing devices referred to herein, may be any suitable computing device such as, but not limited to, a desktop computer, a laptop computer, a mobile phone such as a smart phone, a tablet, a phablet, smart glasses, other wearable computing device(s), etc.

Additionally or alternatively, the driving instructor may wear a wearable computing device (or devices) 142, such as a smartwatch as shown in the example of FIG. 1, which wearable computing device 142 may also have a suitable user interface and be communicatively coupled to the mobile device 130 to allow the driving instructor 136 to receive information regarding, for example, the quality of the driving as further discussed below.

In embodiments where, as noted above and as further discussed below, the at least one indication of the quality of the driving of the vehicle is provided to the insurance provider, the insurance provider may receive this indication at an insurance provider server 144. Thus, the insurance provider server 144 may also be communicatively coupled to the computer network 104. The insurance provider server 144, in some embodiments, may also make available for download (e.g., via the computer network 104) the application executed by the mobile device 130 to implement functionality described herein. It will be appreciated that one or more of the servers 106-122 and/or 144 may be a server provided by or used by the insurance provider, or use of which the insurance provider otherwise controls or facilitates.

In various embodiments, processors of the mobile device 130 and other devices, such as the servers 106-122 and 144, may execute instructions to transmit data to, receive data from, or otherwise communicate with devices of the example system 100 via the computer network 104 as further described below. The computer network 104 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The computer network 104 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

As further described below, the example system 100 allows determining a quality of driving of the vehicle 102 (e.g., whether the vehicle 102 is driven by the driver 126 or is an autonomous vehicle), and allows, among other advantages, determination of at least one indication of the quality of the driving of the vehicle 102 based on particular information provided from at least one driving condition information indicating device and information indicating at least one driving metric.

III. Example Operation of Computing Devices

Figure 2:
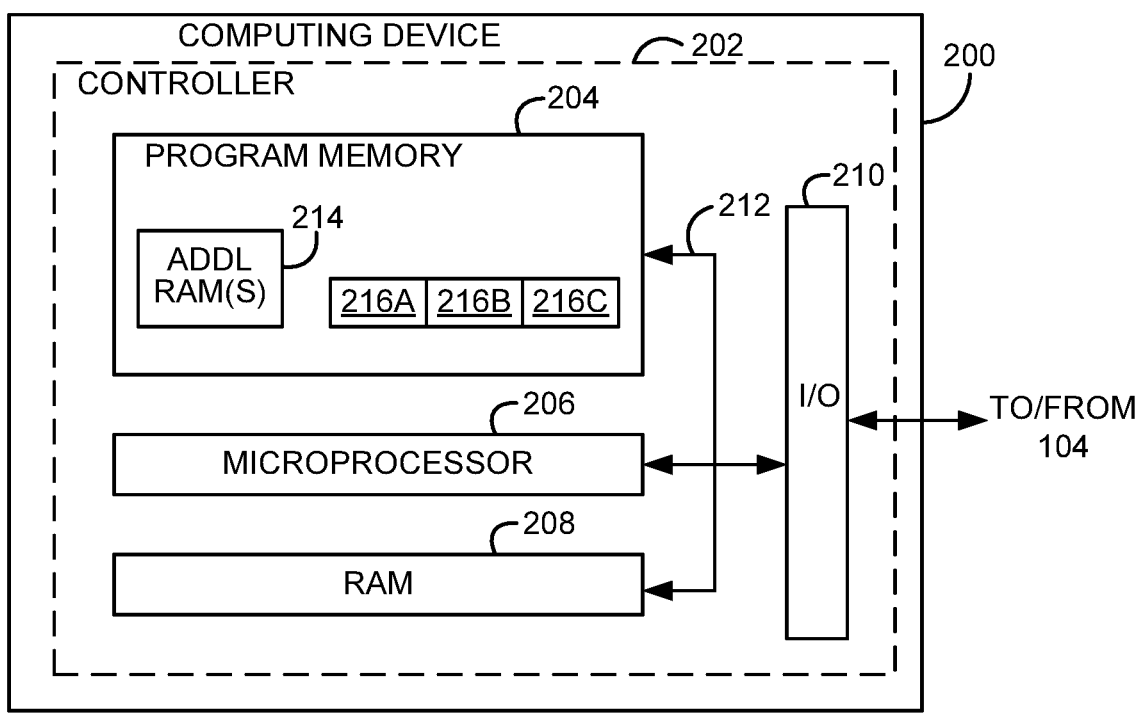
FIG. 2 illustrates an example computing device and components thereof that may be used in implementing, for example, various devices of the example system of FIG. 1.

FIG. 2 illustrates an example computing device 200 and components thereof that may be used in implementing, for example, the mobile device 130 and/or other devices of the example system 100, such as one or more of the servers 106-122 and/or 144. The example computing device 200 may include a controller 202. The controller 202 may include a program memory 204, a microcontroller or a microprocessor 206, a random-access memory (RAM) 208, and an input/output (I/O) circuit 210, all of which may be interconnected via an address/data bus 212. The program memory 204 may store computer-executable instructions, which may be executed by the microprocessor 206.

It should be appreciated that although FIG. 2 depicts only one microprocessor 206, the controller 202 may include multiple microprocessors 206. Similarly, the program memory 204 of the controller 202 may include additional RAM(s) 214 and multiple program memories 216A, 216B and 216C (or any suitable number of multiple program memories) storing one or more corresponding modules, routines, and/or instructions, etc. according to the particular configuration of the controller 202 and the computing device 200. Such modules, routines, and/or instructions, etc. may be used in performing various operations for determining a quality of driving of a vehicle, such as example operations as described herein, including transmitting data to, receiving data from, or otherwise communicating with devices of the example system 100 via the computer network 104 by way of the I/O circuit 210. Additionally, although FIG. 2 depicts the I/O circuit 210 as a single block, the I/O circuit 210 may include a number of different types of I/O circuits (not depicted). The RAM(s) 208, 214 and the program memory/memories 216A, 216B and 216C may be implemented in any known form of non-transitory computer readable storage media, including but not limited to semiconductor memories, magnetically readable memories, and/or optically readable memories. It should also be appreciated that the example computing device 200, and thus, for example, the mobile device 130 and/or the one or more of the servers 106-122 and/or 144, for example, may include additional, fewer, or alternate components.

IV. Example Method for Determining a Quality of Driving of a Vehicle

Figure 3:
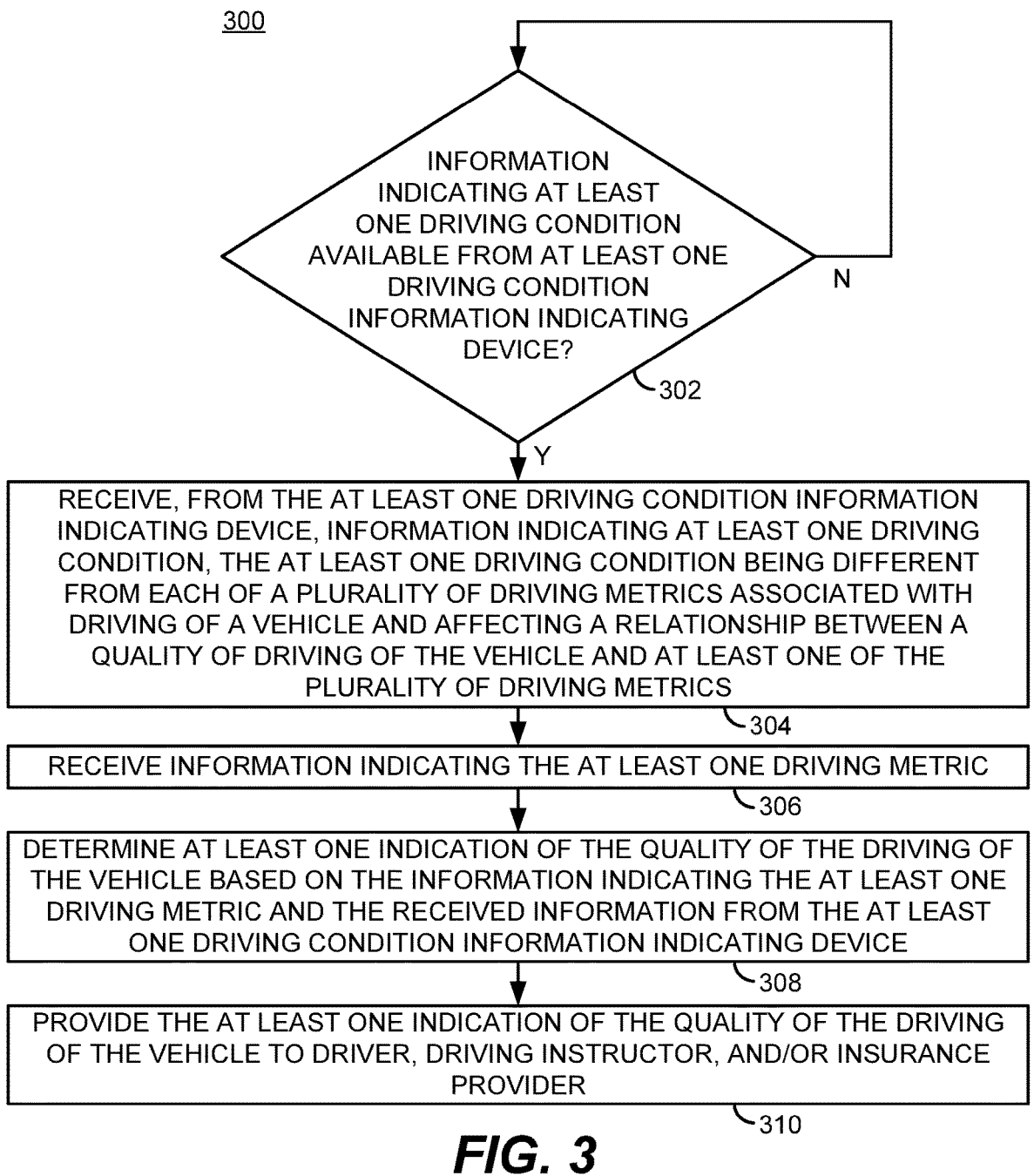
FIG. 3 is a flow chart of an example method, routine, or process for determining a quality of driving of a vehicle.

FIG. 3 is a flow chart of an example method, routine, or process 300 for determining a quality of driving of a vehicle, such as the vehicle 102, where the driving of the vehicle may be by the driver 126, for example. One or more processors, which may be one or more processors of the mobile device 130 that execute an application on the mobile device 130 as described above, for example, may (e.g., as part of executing the application on the mobile device 130) determine whether information indicating at least one driving condition is available from at least one driving condition information indicating device (e.g., one or more of the servers 106-122) (block 302). Such information indicating at least one driving condition may be available, for example, when an insurance provider and/or at least one vendor have obtained such information so that such information is available to be provided, and when a location of the vehicle 102 is known so that the information corresponds to the location.

If it is determined that the information indicating at least one driving condition is not available from the at least one driving condition information indicating device, the actions described with respect to block 302 may be repeated. That is, for example, the determination as to whether such information is available may be repeated until it is determined that such information is available.

If, on the other hand, it is determined that the information indicating the at least one driving condition is available from the at least one driving condition information indicating device, the one or more processors may receive, from the at least one driving condition information indicating device (e.g., one or more of the servers 106-122), the information indicating the at least one driving condition (block 304). The at least one driving condition may be different from each of a plurality of driving metrics associated with the driving of the vehicle 102. The at least one driving condition may be, for example, a speed limit corresponding to a particular location (e.g., a particular section of a road). Additional examples of the at least one driving condition and examples of the plurality of driving metrics are further discussed below with respect to, for example, FIG. 5. As also further discussed below, the at least one driving condition may affect a relationship between the quality of the driving of the vehicle 102 and at least one driving metric of the plurality of driving metrics associated with the driving of the vehicle 102. For example, where the at least one driving condition is a speed limit, and the at least one driving metric is, for example, an actual speed of the vehicle 102, the speed limit may affect a relationship between the actual speed and the quality of the driving of the vehicle 102. More particularly, the quality of the driving of the vehicle 102 may be high when the speed limit is close to the actual speed of the vehicle 102, and the quality of the driving of the vehicle 102 may be low when the speed limit is significantly below the actual speed of the vehicle 102 (indicating that the vehicle 102 is driving too fast).

With continued reference to the actions described with respect to block 304, the information indicating the at least one driving condition may be received based on any suitable factor or factors, such as, for example, a location of the vehicle 102 as determined by, for example, a Global Positioning System (GPS) receiver located in the vehicle 102, such as a GPS receiver of the mobile device 130. For example, the information indicating the at least one driving condition may be information indicating a speed limit that corresponds to the location of the vehicle 102.

The one or more processors may receive information indicating the at least one driving metric associated with the driving of the vehicle 102 (block 306). Examples of the at least one driving metric are further discussed below with respect to, for example, FIG. 5. As discussed above, however, one example of a driving metric may be an actual speed of the vehicle 102. The information indicating the at least one driving metric may, in some embodiments, be determined by an application (e.g., the aforementioned application) executing on the mobile device 130. For example, in some embodiments, an accelerometer of the mobile device 130 and/or any other suitable components and/or functionality of the mobile device 130 (e.g., magnetometer, etc.) may be used in determining the information indicating the at least one driving metric. In order for the accelerometer and/or other component(s) and/or other functionality of the mobile device 130 to accurately determine the information indicating the at least one driving metric, the mobile device 130 may be placed in a cup holder of the vehicle 102 between the driver seat 128 and the passenger seat 138, as shown in the example of FIG. 1. In another embodiment, the mobile device 130 may be secured in the dashboard mount 132, as also shown in the example of FIG. 1 for completeness of explanation.

The one or more processors may determine at least one indication of the quality of the driving of the vehicle 102 (e.g., by the driver 126 or, in some embodiments, the quality of the driving of the vehicle 102 when the vehicle 102 is an autonomous vehicle) (block 308). The determination of the at least one indication of the quality of the driving of the vehicle 102 may be based on the information indicating the at least one driving metric and based on the received information from the at least one driving condition information indicating device (e.g., one of the servers 106-122). The at least one indication of the quality of the driving of the vehicle 102 may be, for example, an indication of a variation in a speed of the driving of the vehicle 102 within a particular amount of time. Additional examples of the at least one indication of the quality of the driving of the vehicle 102 are discussed in greater detail below with respect to, for example, FIG. 5.

The one or more processors may provide the at least one indication of the quality of the driving of the vehicle 102 to at least one of the driver 126, a driving instructor (e.g., the driving instructor 136) present in the vehicle 102 during the driving of the vehicle 102 by the driver 126, or an insurance provider providing insurance coverage with respect to at least one of the vehicle 102 or the driver 126 (block 310). For example, the at least one indication of the quality of the driving of the vehicle 102 may be provided to the insurance provider by providing the at least one indication via the computer network 104 to the insurance provider server 144.

In embodiments where the at least one indication of the quality of the driving of the vehicle 102 is provided to the driver 126, the at least one indication of the quality of the driving may be provided via, for example, a user interface of the mobile device 130 to, for example, allow the driver 126 to self-assess driving behaviors and attempt to improve his or her driving behaviors in the interest of increased safety, decreased insurance premiums or insurance discounts (e.g., where the at least one indication is also provided to the insurance provider), etc. It will be appreciated in light of the teaching and disclosure herein that while an insurance provider is discussed and may provide insurance coverage with respect to at least one of the vehicle 102 or the driver 126, neither the vehicle 102 nor the driver 126 need be a customer of (e.g., have insurance coverage issued by) the insurance provider. Thus, the driver 126 may, for example, download the application to be executed on the mobile device 130 even though the driver 126 may not be a customer of the insurance provider. In such a circumstance, the application may be downloaded to the mobile device 130 from the insurance provider server 144 (even though the driver 126 is not a customer of the insurance provider) or from any other suitable device, including any suitable device (e.g., server) not shown in the example system 100.

Moreover, with continued reference to the actions described with respect to block 310, in embodiments where the at least one indication of the quality of the driving of the vehicle 102 is provided to the driver 126 and/or to the driving instructor 136, the driver 126 and/or the driving instructor 136 may be provided with the ability to review all of the driving of the vehicle 102 during a particular trip and/or the ability to select one or more segments of the particular trip with respect to which to review the driving. By providing the driving instructor 136 with the ability to review the driving in this manner, and by providing the driving instructor 136 with the ability to review the driving in real time as further described below, the driving instructor 136 may be able to provide more timely and useful feedback to the driver 126 (e.g., student driver). Moreover, as discussed below, the increased amount of information made available by way of the various embodiments described herein may advantageously allow the driver 126, the driving instructor 136, and/or the insurance provider to more accurately assess the performance of the driver 126.

With still further reference to the actions described with respect to block 310, the ability to review all of the driving and/or one or more segments may be provided as an ability to review, for example, speed and speed limit of the vehicle 102 along particular points of the trip by selecting an option to play back the speed and speed limit in a manner that shows how each of the speed and speed limit changes during the trip, as further described below. Additionally, the ability to review one or more segments may be provided by way of the ability to select one or more segments on a map displayed via a user interface of, for example, the mobile device 130, as also further described below.

With yet further reference to the actions described with respect to block 310, in embodiments where the at least one indication of the quality of the driving of the vehicle 102 is provided to the insurance provider, the insurance provider may use the at least one indication of the quality of the driving of the vehicle 102 to determine an insurance rating and/or premium adjustment, e.g., for insurance coverage provided with respect to the driver 126, the vehicle 102, or both. The insurance rating and/or premium adjustment may be determined based on a score or other metric where the at least one indication of the quality of the driving of the vehicle 102 is provided as a score or other quality metric, and/or may be determined based on historical quality-of-driving data for the driver 126 and/or the vehicle 102, such as, for example, based on a relationship of the determined at least one indication of the quality of the driving to the historical quality-of-driving data. Such a relationship may be a weighting of the at least one indication of the quality of the driving against the historical quality-of-driving data, such as a weighting that accounts for the amount of historical quality-of-driving data already available to the insurance provider, or may be any other suitable relationship. In general, any suitable manner of determining an insurance rating and/or premium adjustment may be implemented.

As will be apparent from the above description, and as should be appreciated with respect to all examples presented in this disclosure, various ones of the functions or operations shown in FIG. 3 are optional. Furthermore, the functions or operations shown in FIG. 3 (and each flow chart herein) may be performed in any suitable order, any desired number of times, and/or with any suitable variation to the particular order and/or combination shown so as to achieve a desired result, such as a desired manner of determining a quality of driving of a vehicle (e.g., the vehicle 102).

FIG. 4 is a flow chart of another example method, routine, or process 400 for determining a quality of driving of a vehicle, such as the vehicle 102. It will be appreciated from the teaching and disclosure below that various aspects of the example method, routine, or process 400 may be illustrative of greater detail of example implementations of aspects of the example method, routine, or process 300 (e.g., may be illustrative of greater detail of example implementations of the functions described with respect to blocks 308 and 310).

One or more processors, which may be one or more processors of the mobile device 130, may determine at least one gradation of the quality of the driving of the vehicle 102 (block 402). With reference to the discussion above, the at least one gradation may be determined for display on a map. With further reference to the discussion above, the at least one gradation may indicate the quality of the driving of the vehicle 102 relative to the quality of the driving of the vehicle 102 as indicated by a different gradation. For example, a map of a driving trip may designate certain portions of the trip with a red color to show one gradation, with the red color indicating a lowest relative quality of driving. The map may also or alternatively designate portions of the trip with other colors such as yellow (e.g., a medium relative quality of driving) and/or green (e.g., a highest relative quality of driving). Presentation of gradations on a map, such as a map shown via a user interface of the mobile device 130 or the computing device 140, is further described below. Moreover, gradations other than color may also or alternatively be used. For example, different types of markers on a map or other suitable summary of a driving trip may serve as different gradations indicating different relative qualities of driving of the vehicle 102, different types of lines on a map or other suitable summary may serve as different gradations (e.g., smoother lines on a map may indicate higher relative driving quality and more jagged lines on the map may indicate lower relative driving quality), and/or any suitable types of gradations may be implemented and provided via, for example, a user interface of the mobile device 130.

The one or more processors may provide, to at least one of the driver 126 or the driving instructor 136, at least one of: (i) an ability to review all of the driving of the vehicle 102 during a particular trip, or (ii) an ability to select one or more segments of a particular trip with respect to which to review the driving of the vehicle 102 (block 404).

The one or more processors may provide an ability to review, at different times during at least one of all of the driving of the vehicle 102 (e.g., all of the driving of the vehicle 102 during a particular trip) or the one or more selected segments (e.g., as selected as described with respect to block 404), the at least one driving metric and/or at least a portion of the information indicating the at least one driving condition (block 406). Thus, for example, as discussed above, the driver 126 and/or the driving instructor 136 may be provided with the ability to review speed and speed limit of the vehicle 102 along particular points of the trip by selecting an option to play back the speed and speed limit in a manner that shows how each of the speed and speed limit changes during the trip. Review of one or more segments may be implemented by selection of the one or more segments on a map, as also discussed above. It will be understood that performance of at least some of the actions described with respect to block 406 may constitute performance of at least some of the actions described with respect to block 404, with the discussion of the at least some actions described with respect to block 406 being a more detailed discussion of the at least some actions described with respect to block 404. Moreover, review of an entire trip and/or one or more segments of a trip, including by use of a map and/or including review of metrics such as a speed of the vehicle 102 and a speed limit, is further described below with respect to, for example, FIGS. 6, 7, and 8.

It will further be appreciated in light of the teaching and disclosure herein that, in some embodiments, performance of the actions described with respect to block 402 may constitute performance of at least some of the actions described with respect to block 308 as discussed above with respect to FIG. 3. Additionally, in some embodiments, performance of the actions described with respect to blocks 404 and 406 may constitute performance of at least some of the actions described with respect to 310 as discussed above with respect to FIG. 3.

Figure 5:
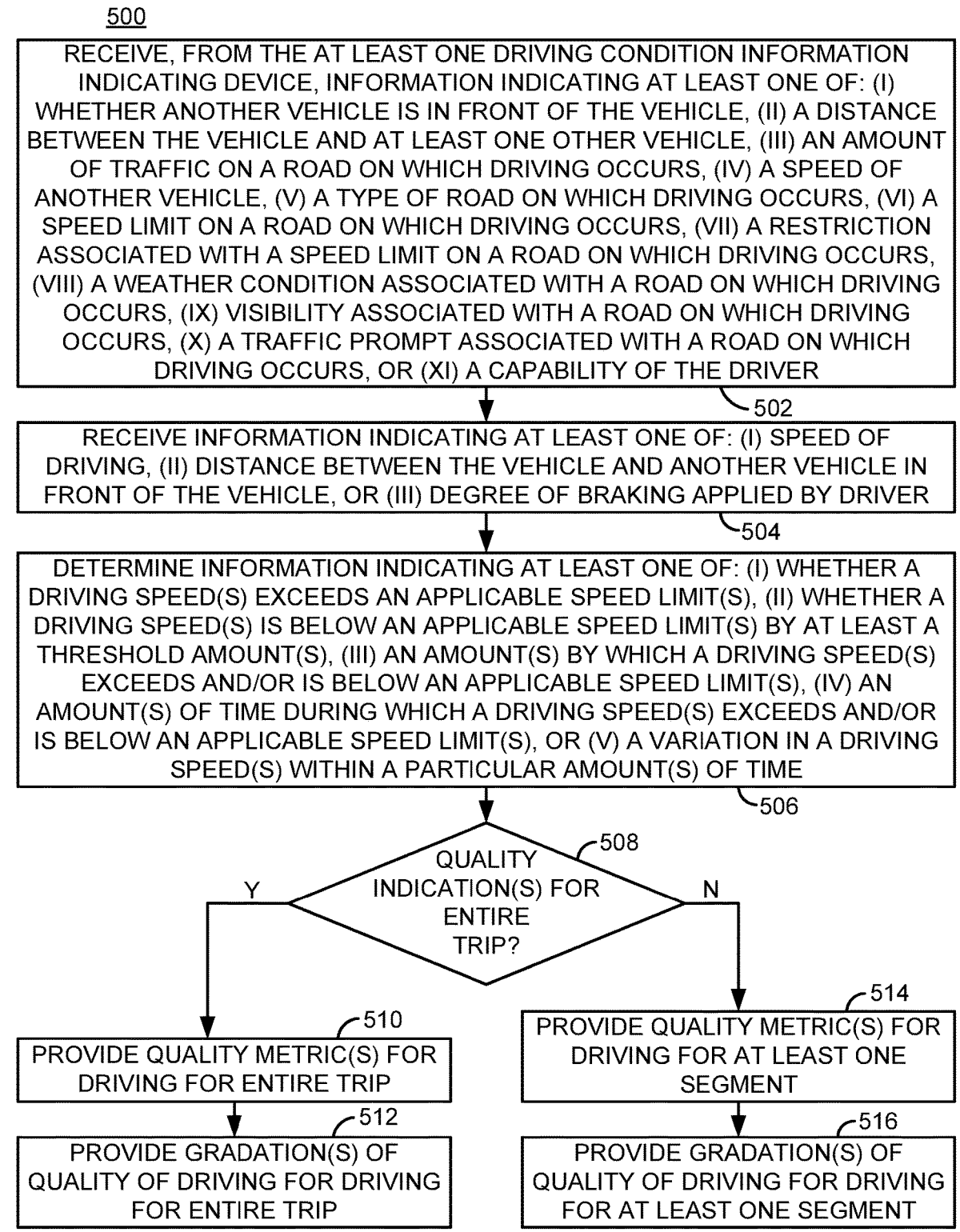
FIG. 5 is a flow chart of yet another example method, routine, or process for determining a quality of driving of a vehicle.

V. Example Further Aspects of Method for Determining a Quality of Driving of a Vehicle FIG. 5 is a flow chart of an example method, routine, or process 500 for determining a quality of driving of a vehicle, such as the vehicle 102. It will be appreciated from the teaching and disclosure herein that the example method, routine, or process 500 may include further aspects of a method, routine, or process as described above for determining a quality of driving of a vehicle, such as further aspects of the example method, routine, or process 300 and/or further aspects of the example method, routine, or process 400.

One or more processors, which may be one or more processors of the mobile device 130, may receive, from the at least one driving condition information indicating device (e.g., from at least one of the servers 106-122 via the computer network 104), the information indicating the at least one driving condition (block 502). For example, the received information may be or may include information indicating at least one of: (i) whether another vehicle is in front of the vehicle 102 during the driving of the vehicle 102, (ii) a distance between the vehicle 102 and at least one other vehicle during the driving of the vehicle 102, (iii) an amount of traffic on a road on which the driving of the vehicle 102 occurs, (iv) a speed of another vehicle during the driving of the vehicle 102, (v) a type of road on which the driving of the vehicle 102 occurs, (vi) a speed limit on a road on which the driving of the vehicle 102 occurs, (vii) a restriction associated with a speed limit on a road on which the driving of the vehicle 102 occurs, (viii) a weather condition associated with a road on which the driving of the vehicle 102 occurs, (ix) visibility associated with a road on which the driving of the vehicle 102 occurs, (x) a traffic prompt associated with a road on which the driving of the vehicle 102 occurs, or (xi) a capability of the driver 126. Other suitable information may also or alternatively be received.

With reference to particular examples of the received information, the information indicating whether another vehicle is in front of the vehicle 102 during the driving of the vehicle 102 may be determined by, for example, an application executing on the mobile device 130 (e.g., executed by the one or more processors of the mobile device 130) using information detected or otherwise received via the camera 134 of the mobile device 130. Thus, in this example, the mobile device 130 may be considered to be one of the at least one driving condition information indicating device. A distance between the vehicle 102 and at least one other vehicle during the driving of the vehicle 102 may be determined in a similar manner, in some embodiments, where an application executing on the mobile device 130 may perform, for example, suitable calculations or other determinations based on an image or images received by the camera 134 to determine the distance. The distance may be determined as a "following distance," which may be determined in terms of length, time (e.g., an amount of time during which, if the driver 126 applies brakes of the vehicle 102, the vehicle 102 has to come to a stop without colliding with the other vehicle in front of the vehicle 102), etc.

In one example, an application may be provided by a third party, such as a third-party vendor of the insurance provider, and may execute on the mobile device 130 to determine, for example, a distance between the vehicle 102 and at least one other vehicle (e.g., a following distance between the vehicle 102 and another vehicle in front of the vehicle 102). One example of such an application is the iOnRoad™ application.

The amount of traffic on a road on which the driving of the vehicle 102 occurs may be determined in any one or more of a number of suitable ways. More particularly, for example, an indication of the amount of traffic may be determined by information received via the camera 134 of the mobile device 130. In some embodiments, information received via the camera 134 may be used to determine or estimate a speed of another vehicle in front of the vehicle 102, and this estimate of the speed of the other vehicle may be used to estimate the amount of traffic. Additionally or alternatively, such as in embodiments where the mobile device 130 is not secured in the dashboard mount 132 and is instead in the cup holder, information indicative of an amount of traffic on a road on which the driving of the vehicle 102 occurs may be determined using, for example, an application that uses, for example, crowdsourced data indicative of location and/or speed of other vehicles. Additionally, such an application using crowdsourced data indicative of speed of other vehicles may be used to determine information indicating a speed of another vehicle(s) during the driving of the vehicle, in one example. Such an application may be, for example, WAZE®. In some embodiments, such crowdsourced data may be obtained by the mobile device 130 from the traffic information server 106 and/or the other vehicle speed information server 108 via the computer network 104.

It will be appreciated that various applications described throughout this description may in some cases have some or all of the functionality in a single application, such as a single application executing on the mobile device 130. As just one example, an application that is executed on/by the mobile device 130 may both perform suitable operations to determine a following distance and may receive and use crowdsourced data indicative of location and/or speed of other vehicles.

With continued reference to the actions described with respect to block 502, a type of road on which the driving of the vehicle 102 occurs may be determined using, for example, the camera 134, information from the road type information server 110 that is received by the mobile device 130 via the computer network 104 based on GPS information, and/or in any other suitable manner. As with other devices described herein and shown in the example system 100, the road type information server 110 may be a server of a third-party entity such as a third-party vendor, or a server of the insurance provider, for example.

A speed limit on a road on which the driving of the vehicle 102 occurs may be determined using, for example, information from the speed limit information server 112. In one embodiment, the speed limit information server 112 may receive a speed limit from a suitable source, such as from a third-party vendor via a communication network that need not be the computer network 104, where the speed limit corresponds to a location of the vehicle 102 as indicated by GPS information. In another embodiment, the mobile device 130 may execute an application that may receive speed limit information from a third-party vendor that is associated with, for example, a location of the vehicle 102 as indicated by GPS information. Such an application may be, for example, HERE Drive®.

A restriction associated with a speed limit on a road on which the driving of the vehicle 102 occurs may be determined using, for example, information from the speed limit restriction information server 114. In one embodiment, the speed limit restriction information server 114 may receive information regarding a speed limit restriction, such as information indicating that a particular region is a school zone, a construction zone where the effective speed limit is thus lower than the posted speed limit, etc., from another server(s) (not shown). The other server(s) may store, for example, location data indicating school zones, construction data indicating construction zones, and/or any other suitable data indicating portions of road(s) that have restricted speed limits lower than posted speed limits on speed limit signs. In some embodiments, a restriction on speed limit may already be taken into account in the speed limit information available from the speed limit information server 112, such as in the case of a school zone, and thus need not be accounted for with information from the speed limit restriction information server 114. In another embodiment, the mobile device 130 may execute an application that may receive speed limit restriction information from a third-party vendor, where the speed limit restriction information is associated with, for example, a location of the vehicle 102 as indicated by GPS information. Such an application may be, for example, WAZE®.

With further reference to the actions described with respect to block 502, a weather condition and/or a visibility associated with a road on which the driving of the vehicle 102 occurs may be determined using, for example, information from the weather condition information server 116 and/or the visibility information server 118. In one embodiment, the weather condition information server 116 and/or the visibility information server 118 may receive information regarding one or more weather conditions and/or other condition(s) affecting visibility from a suitable source, such as from a third-party vendor via a communication network that need not be the computer network 104 (but that, as with other examples described herein, may be the computer network 104). The one or more weather conditions and/or other condition(s) affecting visibility may correspond to a location of the vehicle 102 as indicated by, for example, GPS information. In some examples, the received information may be or may include satellite imagery or information from satellite imagery. In situations where a map is provided (e.g., via a user interface), as discussed above and as further described below, features of the satellite imagery corresponding to the area surrounding the location of the vehicle 102 may be overlaid on the map to provide more readily available access to weather-related or visibility-related information.

Weather conditions may include, for example, rain, snow, ice, sleet, and/or any other condition that may affect a relationship between a quality of driving of the vehicle 102 and at least one driving metric (e.g., when the vehicle 102 is traveling on a snowy road, given a particular speed of the vehicle 102 (which speed may be the at least one driving metric), the quality of driving may be expected to be higher at lower speeds of the vehicle 102). Condition(s) affecting visibility may include weather conditions and non-weather conditions. For example, rain may be expected to affect visibility in addition to being a weather condition. However, smoke and/or fire caused by a nearby accident, for example, may affect visibility but not be a weather condition. As another example, lighting conditions (e.g., time of day or other lighting conditions, such as abundance of street lighting at night) on a road on which the driving of the vehicle 102 occurs may affect visibility but not be weather conditions.

A traffic prompt associated with a road on which the driving of the vehicle 102 occurs may be determined using, for example, information from the traffic prompt information server 120. The traffic prompt information server 120 may, in one embodiment, receive information regarding traffic prompts (e.g., status of traffic lights, locations of stop signs, passage of emergency medical vehicles that necessitate stoppage of other traffic, etc.) from a suitable source, such as from a third-party vendor via a communication network that need not be the computer network 104. Such information indicating at least one traffic prompt may correspond to a location of the vehicle 102 as indicated by, for example, GPS information.

Information indicating a capability of the driver 126 may be received from, for example, the driver capability information server 122. The driver capability information server 122 may, in one embodiment, receive information from the insurance provider, such as from the insurance provider server 144, regarding a capability of the driver 126. Information regarding a capability of the driver 126 may also be received from other suitable sources, such as from one or more administrative agencies that may have licensed the driver 126 and/or law enforcement agencies that may have issued one or more traffic citations to the driver 126. The information regarding the capability of the driver 126 may include, for example, an age of the driver, which may impact an expected night vision ability or depth perception of the driver 126; other information that may be available (e.g., test results from an administrative agency) that is indicative of abilities such as night vision ability, depth perception, and/or any other ability suitable for consideration in carrying out the operations described herein; an accident or claims history of the driver 126; etc.

Generally speaking, and with still further reference to the actions described with respect to block 502, the information indicating the at least one driving condition—various examples of which have been described in detail above—may, with reference to the discussion above, affect a relationship between a quality of driving of the vehicle 102 and at least one driving metric. By way of example, with respect to the aforementioned information indicating whether another vehicle is in front of the vehicle 102 during the driving of the vehicle 102, such information may affect a relationship between a speed and/or acceleration of the vehicle 102 from a stopped position. More particularly, for example, if the speed of the vehicle 102 increases slowly as compared to an increase in speed that would be expected for a speed limit that applies to a road on which the vehicle 102 is beginning to move from a stopped position, the quality of the driving may be relatively low. Additionally, if the speed of the vehicle 102 fluctuates notably without any other vehicle present in front of the vehicle 102 and without any other factor that would cause such fluctuation, such as entry into and exit from a construction zone, the quality of the driving may be relatively low because of poor management of speed (e.g., poor ability to maintain a constant speed when conditions do not necessitate frequent and/or notable changes in speed).

As just one further example, an indication of a time taken by the driver 126 to apply braking to the vehicle 102 when a stop is necessitated may be an indication of a quality of driving of the vehicle 102, and may be affected by factors noted above, such as the distance between the vehicle 102 and at least one other vehicle during driving. When the distance between the vehicle 102 and at least one other vehicle becomes shorter while the vehicle 102 maintains a relatively constant speed, for example, and an abrupt decrease in speed of the vehicle 102 (e.g., corresponding to a "sharp" breaking event) follows, these events may indicate a lower quality of driving than a more gradual decrease in speed of the vehicle 102. Stated another way, these events may indicate a relatively worse reaction time, e.g., that the driver 126 took longer to react to the presence of another vehicle ahead of the vehicle 102 during driving. Depending upon how the at least one indication of the quality of the driving of the vehicle 102 is provided, the driver 126 may be notified in self-assessment results, for example, of the need to improve reaction time; the driving instructor 136 may be provided with data supporting the need of the driver 126 to improve reaction time; and/or the insurance provider may worsen the rating and/or insurance premium or, in some cases, consider the poor reaction time as a factor in a rating and/or premium adjustment decision.

It will be appreciated that the numerous possible types of information indicating the at least one driving condition affect numerous possible relationships between a quality of driving of the vehicle 102 and at least one driving metric, and that describing all such ways in which information indicating the at least one driving condition may affect relationships between a quality of driving and at least one driving metric would be impractical if not impossible.

With continued reference to the example method, routine, or process 500, the one or more processors may receive the information indicating the at least one driving metric by receiving information indicating at least one of: (i) a speed of the driving of the vehicle 102, (ii) a distance between the vehicle 102 and another vehicle in front of the vehicle 102 during the driving of the vehicle 102, or (iii) a degree of braking applied by the driver 126 during the driving of the vehicle 102 (block 504). The speed of the vehicle 102 may be determined by, for example, an application executing on the mobile device 130 using suitable features and functionality of the mobile device 130, such as a speedometer application executing on the mobile device 130, or in any other suitable manner.

The distance between the vehicle 102 and another vehicle in front of the vehicle 102 may be determined as described above, for example, and may be determined as a "following distance" in terms of length, time, etc. Such a following distance may, in some examples, be one or both of the at least one driving condition or the at least one driving metric, because traffic may affect the following distance and the driving of the vehicle 102 may also affect the following distance (e.g., if the driver 126 does not slow the vehicle 102 as the vehicle 102 approaches another vehicle in front of the vehicle 102). Determination of the at least one indication of the quality of the driving of the vehicle 102 may account for the following distance as both a driving condition and a driving metric by, for example, performance of suitable computations (e.g., by an application executing on the mobile device 130) to cause the following distance to be treated as a driving condition and/or as a driving metric. For example, such computations or other suitable determinations may cause the following distance to be treated as a driving condition and/or as a driving metric to appropriate relative degree(s) based on other information such as, but not limited to, speed of the vehicle 102.

With reference to the discussion above, the degree of braking applied by the driver 126 during the driving of the vehicle 102 may be determined by, for example, determining whether a distance between the vehicle 102 and at least one other vehicle in front of the vehicle 102 becomes shorter while the vehicle 102 maintains a relatively constant speed, and/or by whether an abrupt decrease in speed of the vehicle 102 occurs. It will be appreciated that in some embodiments, upon the occurrence of both of (i) the distance between the vehicle 102 and the at least one other vehicle shortening while the vehicle 102 maintains a relative constant speed and (ii) the speed of the vehicle 102 subsequently decreasing abruptly, the degree of braking may be determined to be high with more certainty than if one of these two events occurs, and/or the quality of driving of the vehicle 102 may be more negatively affected because the occurrence of both of these two events may be a stronger indicator of relatively low-quality driving.

The one or more processors may determine the at least one indication of the quality of the driving of the vehicle 102, including determining information indicating at least one of: (i) whether a speed(s) of the driving of the vehicle 102 exceeds a speed limit(s) applicable to at least one portion of the driving of the vehicle 102 (e.g., driving of the vehicle 102 on a particular road or a particular portion thereof), (ii) whether a speed(s) of the driving of the vehicle 102 is below a speed limit(s) applicable to at least one portion of the driving of the vehicle 102 by at least a threshold amount(s) (e.g., an amount predetermined and stored in the insurance provider server 144 and/or the mobile device 130, or any suitable amount), (iii) an amount(s) by which a speed(s) of the driving of the vehicle 102 exceeds, is below, or both exceeds and is below (e.g., during different portions of the driving) a speed limit(s) applicable to at least one portion of the driving of the vehicle 102, (iv) an amount(s) of time during which a speed(s) of the driving of the vehicle 102 exceeds, is below, or both exceeds and is below a speed limit(s) applicable to at least one portion of the driving of the vehicle 102, or (v) a variation in a speed(s) of the driving of the vehicle 102 within a particular amount(s) of time (block 506).

More particularly, in one example, the one or more processors may determine information indicating the at least one of the aforementioned indications of quality, and/or any other suitable indication of quality, by determining how much time and at what locations the vehicle 102 was driving at an acceptable speed, how much time and at what locations the vehicle 102 was driving 0-5 miles per hour above the speed limit, how much time and at what locations the vehicle 102 was driving 5-10 miles per hour above the speed limit, etc. The aforementioned gradations of the quality of the driving of the vehicle 102 may, in one example, be implemented by showing, on a map, lower relative quality gradations as being associated with locations in which the vehicle 102 exceeded the speed limit by a higher amount, for example. For example, such locations on the map associated with lower relative quality gradations may have colors indicating such lower relative quality, which may in some examples be shades of red and orange, whereas colors indicating higher relative quality may in some examples be shades of green and blue.

As another example, significant variations in speed of driving of the vehicle 102 without any reason indicated by other factors such as traffic, traffic prompts, etc. may result in a lower indication of the quality of the driving of the vehicle 102, and in some cases may result in a lower indication of the quality of the driving even when such variations occur largely or entirely under the applicable speed limit(s). A variation or variations in speed of driving of the vehicle 102 may, in one embodiment, be determined as a percentage variation(s) for use in determining the at least one indication of the quality of the driving of the vehicle 102. It will be appreciated that the various example indications of the quality of the driving of the vehicle 102 described above, and/or any other suitable indications, may be determined in a number of ways based on a number of suitable driving conditions and driving metrics, and that describing every possible way would be impractical if not impossible. As such, it will be understood that the discussion herein is by way of example only.

As just one further example, with continued reference to the actions described with respect to block 506, it is also noted that the determination of the at least one indication of the quality of the driving of the vehicle 102 may be affected by a following distance between the vehicle 102 and another vehicle in front of the vehicle 102. For example, when the following distance is less than a threshold amount as measured in time, such as less than two and a half seconds or any other suitable amount of time, and is less than the threshold amount for a relatively long period of time, the at least one driving metric may be analyzed differently in order to determine the at least one indication of the quality of the driving of the vehicle 102, because it may be assumed that the vehicle 102 is in relatively high traffic. Conversely, for example, when the following distance is more than the threshold amount as measured in time, such as more than two and a half seconds for a relatively long period of time, the at least one driving metric may be analyzed based on an assumption that the vehicle 102 is in relatively low traffic in order to determine the at least one indication of the quality of the driving of the vehicle 102.

The one or more processors may determine whether the at least one indication of the quality of the driving of the vehicle 102 is to be provided for an entire driving trip or for one or more segments of the entire driving trip, where the entire driving trip may be divided up into multiple segments as noted above (block 508). In this regard, it is noted that division of the trip into segments may not be known until the at least one indication of the quality of the driving of the vehicle 102 is determined, and portions of the trip with similar quality of driving and similar location (e.g., stretches of a road on which the vehicle 102 travels or traveled that have a similar determined indication of the quality of the driving) are grouped into segments, in some examples.

If it is determined that the at least one indication of the quality of the driving of the vehicle 102 is to be provided for the entire trip, the one or more processors may provide a quality metric(s) for the driving of the vehicle 102 during the entire trip (block 510). In some embodiments, a quality metric(s) for the driving of the vehicle 102 during an entire trip or during a segment of the trip may be determined by calculating or otherwise determining one or more scores or other metrics based on the at least one indication of the quality of the driving. For example, the score (or scores) may be a score in the range of 0-100, where 0 is the lowest possible score and 100 is the highest possible score, though any suitable scoring system and/or other technique(s) for determining and providing a quality metric(s) may be implemented. Such a score(s) is further discussed below with respect to, for example, FIG. 8.

The one or more processors may also or alternatively provide at least one gradation (e.g., one gradation with respect to exceeding of a speed limit(s) and/or one gradation with respect to a variation(s) in speed, etc.) of the quality of the driving of the vehicle 102 for all of the driving of the vehicle 102 during the trip (block 512). In one embodiment, the at least one gradation may correspond to a score or scores calculated or determined as described with respect to block 510, or the score that would have been calculated or determined in the event that the actions described with respect to block 510 are not performed and the actions described with respect to block 512 are performed.

If, on the other hand, it is determined with respect to block 508 that the at least one indication of the quality of the driving of the vehicle 102 is to be provided for one or more segments of the entire driving trip, the one or more processors may provide a quality metric(s) for the driving of the vehicle 102 during at least one segment (e.g., during each of the one or more segments for which the at least one indication of the quality of the driving is to be provided) (block 514). The at least one quality metric provided as described with respect to block 514 may be determined in the same or a similar manner as described with respect to block 510.

The one or more processors may also or alternatively provide at least one gradation of the quality of the driving of the vehicle 102 during at least one segment (block 516). In one embodiment, the at least one gradation may correspond to a score or scores calculated or otherwise determined in performing the actions described with respect to block 514, or that would have been calculated or otherwise determined in performing the actions described with respect to block 514 when the actions described with respect to block 514 are not performed.

Figure 6:
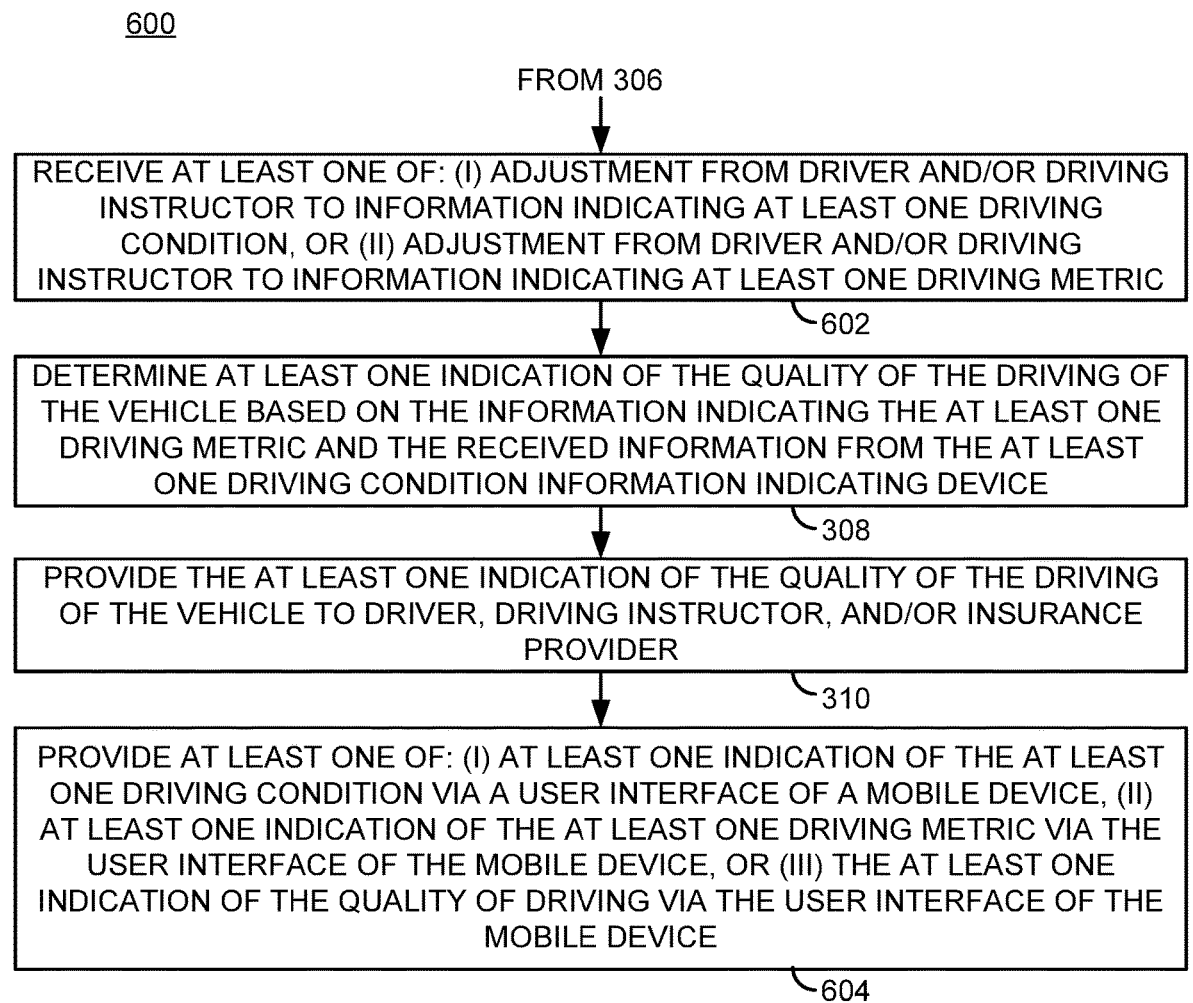
FIG. 6 is a flow chart of still another example method, routine, or process for determining a quality of driving of a vehicle.

FIG. 6 is a flow chart of an example method, routine, or process 600 for determining a quality of driving of a vehicle, such as the vehicle 102. It will be appreciated from the teaching and disclosure herein that the example method, routine, or process 600 may include further aspects of a method, routine, or process as described above for determining a quality of driving of a vehicle, such as further aspects of the example method, routine, or process 300 and/or further aspects of the example method, routine, or process 400.

One or more processors, which may be one or more processors of the mobile device 130, may receive, from the at least one driving condition information indicating device, information indicating at least one driving condition, as described above with respect to block 304 after performing the determination described above with respect to block 302. The one or more processors may also receive the information indicating the at least one driving metric as described above with respect to block 306. As shown in the example of FIG. 6, the one or more processors may then receive at least one of an adjustment from at least one of the driver 126 or the driving instructor 136 to the information indicating the at least one driving condition or an adjustment from at least one of the driver 126 or the driving instructor 136 to the information indicating the at least one driving metric (block 602). For example, the driver 126 or the driving instructor 136 may manually input a suitable entry to the mobile device 130 via, for example, a touch screen or other component of a user interface to indicate, for example, entry into a school zone, a construction zone, poor weather, a traffic light outage, a desired speed lower than that posted as the speed limit or lower than that posted as a restriction on the speed limit, and/or any other suitable adjustment(s). In some cases, the adjustment(s) may already be reflected in the information indicating the at least one driving condition—for example, such information may already indicate the existence of a school zone or construction zone as discussed above—but the user may nonetheless make such an adjustment to ensure the accuracy of the information indicating the at least one driving condition, and/or for greater comfort of the user in knowing such information is accurate, etc. The mobile device 130 may execute an application (such as the application(s) discussed above) that may allow the user to specify when the adjustment no longer applies, how long the adjustment applies and/or whether the adjustment is permanent, and/or otherwise control the adjustment to reflect user preferences.

With continued reference to the actions described with respect to block 602, the driver 126 and/or the driving instructor 136 may also adjust the information indicating the at least one driving metric as discussed above. By way of example, the driver 126 may input an adjustment into, for example, the mobile device 130 to adjust information indicating a degree of braking if, for example, the vehicle 102 is braking in snow. As with adjustments to information indicating the at least one driving condition, this adjustment may already be accounted for by the receipt of information indicating snow on a road on which the vehicle 102 is driving. As another example, the driving instructor 136 may input an adjustment into the computing device 140, for example, to indicate that the driving instructor 136 applied braking where, for example, the vehicle 102 is equipped with a brake on the passenger side for driver education purposes. Determination of the at least one indication of the quality of the driving of the vehicle 102 may be affected accordingly by the resulting indication that the driving instructor 136 applied braking as a result of, for example, a failure of the driver 126 (e.g., student driver) to apply braking soon enough. In some examples, the driving instructor 136 may input such an adjustment into the computing device 140 by, for example, placing a pin on a map of the trip displayed on the computing device 140 at a location where the driving instructor 136 applied braking, for example. The pin may then be used in determining the at least one indication of the quality of the driving of the vehicle 102. Placement of pins on a map, such as a map that may be displayed on the computing device 140 and/or on the mobile device 130 during and/or after driving of the vehicle 102 as described above, is further discussed below.

The one or more processors may also determine the at least one indication of the quality of the driving of the vehicle 102 based on the information indicating the at least one driving condition and the information indicating the at least one driving metric, as described above with respect to block 308. The one or more processors may additionally provide the at least one indication of the quality of the driving of the vehicle 102 as discussed above with respect to block 310.

The one or more processors may also provide at least one of: (i) at least one indication of the at least one driving condition via a user interface of a mobile device (e.g., the mobile device 130), (ii) at least one indication of the at least one driving metric via the user interface of the mobile device (e.g., the mobile device 130), or (iii) the at least one indication of the quality of the driving of the vehicle 102 via the user interface of the mobile device (e.g., the mobile device 130) (block 604). In various embodiments, the mobile device(s) having the user interface may also or alternatively be the computing device 140 and/or the wearable computing device 142. At least some of the information provided as described with respect to block 604 may be provided on a screen that also displays a map or other suitable summary of a driving trip, as further described below.

In some embodiments, the user interface may be a user interface of the computing device 140 and/or the wearable computing device 142, with the mobile device 130 being secured in the dashboard mount 132 (as shown in the example of FIG. 1) or placed in, for example, a cup holder (as also shown in the example of FIG. 1 for completeness of illustration) to allow, for example, proper functioning of the accelerometer of the mobile device 130. In such embodiments, the user interface may provide output to the driving instructor 136 that, if desired, is not accessible to the driver 126 (e.g., student driver). That is, the output may be accessible only to (e.g., viewable only by, able to be sensed only by, or otherwise able to be detected only by) the driving instructor 136 and, in some cases, the insurance provider and/or another desired third party, but not the driver 126. For example, the output may be visual output via the user interface of the computing device 140 and/or the wearable computing device 142 that cannot be seen by the driver 126, the output may be tactile or sensory output of the wearable computing device 142 that cannot be felt and/or interpreted by the driver 126, etc. Thus, in implementing the actions described with respect to block 604, the aforementioned at least one indication(s) may be provided to the driving instructor 136 during the driving of the vehicle 102 so as to allow the indicated information to be withheld from the driver 126. Such an implementation may be desirable, for example, in order to allow the driving instructor 136 to determine when to warn the driver 126 that the driver 126 needs to correct or prepare to correct an aspect of the driving, in order to allow the driving instructor 136 to ask the driver 126 to evaluate his or her driving without knowledge of the aforementioned information, etc.

VI. Example Presentation of Features Corresponding to Driving of a Vehicle

Figure 7:
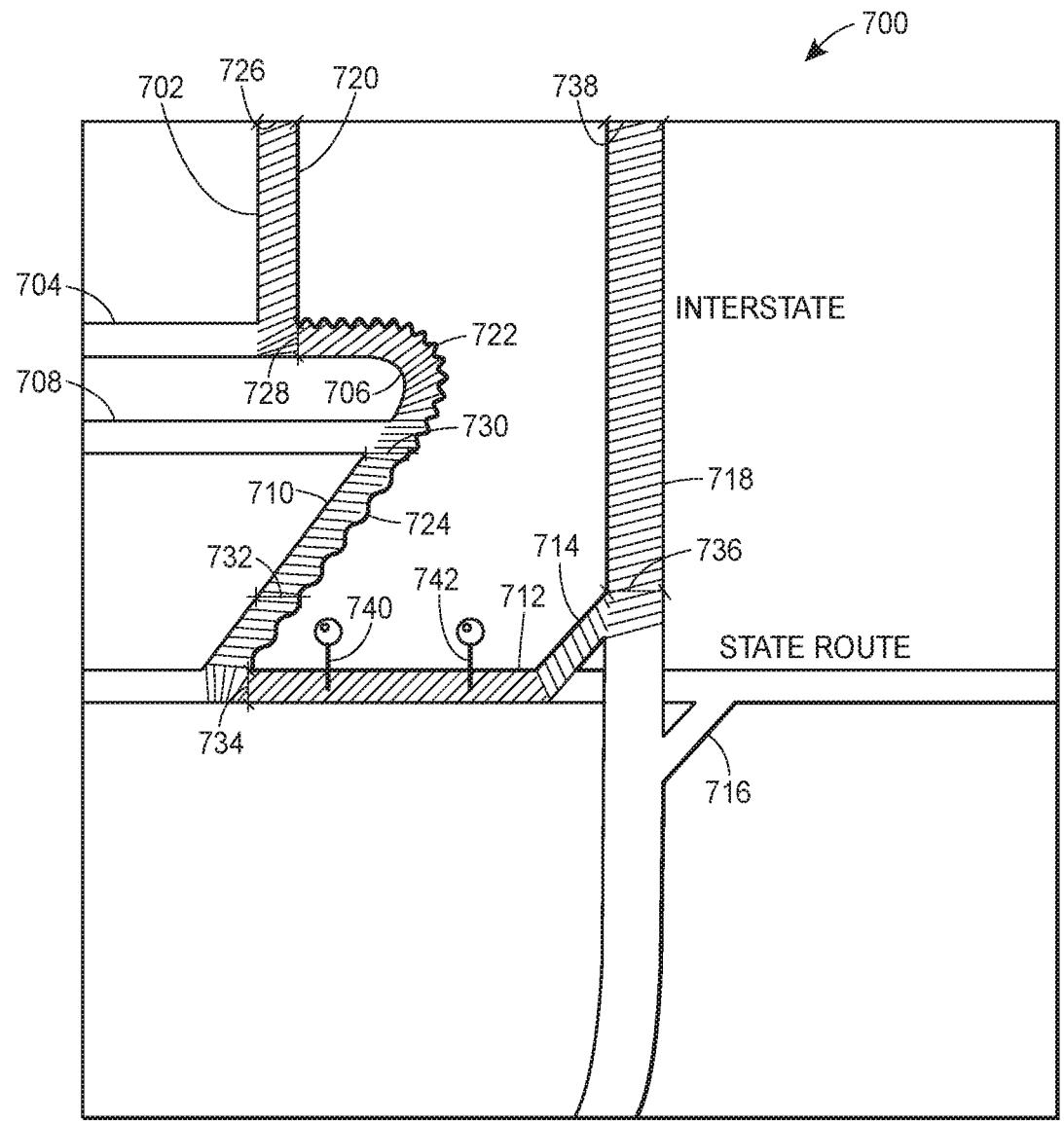
FIG. 7 illustrates an example map that may be used to present features such as at least one determined indication of a quality of driving of a vehicle.

FIG. 7 illustrates an example map 700 that may be used to present features described herein, such as the at least one indication of the quality of the driving of the vehicle 102, to parties such as the driver 126 and/or the driving instructor 136. The example map 700 may be used in conjunction with and/or as part of the example user interface described below with respect to FIG. 8. As shown in FIG. 7, the example map 700 may show first, second, third, fourth, and fifth sections 702, 704, 706, 708, and 710 of side roads. The example map 700 may also show a state route 712 with a first ramp 714 and a second ramp 716 connecting the state route 712 to an interstate 718. The vehicle 102 may, in one example trip, drive on the roads of the example map 700 with hatched lines. The example map 700 is one way in which the driver 126, the driving instructor 136, and/or the insurance provider may review the driving of the vehicle 102 during the driving (e.g., in the case of the driving instructor 136 or the insurance provider) and/or after the driving. With reference to the discussion above, in some cases, gradations may be determined for display on the example map 700 in order to provide indications of relatively high and/or relatively low quality driving of the vehicle 102. Such gradations may be determined and updated during the driving of the vehicle 102, or at the end of the driving of the vehicle 102, such as in response to a prompt or entry from the driver 126 or driving instructor 136 (e.g., via a user interface) that a particular driving trip is completed.

As also discussed above, the gradations may be in the form of color coding, different types of markers, different types of lines, etc. In the example map 700, the first section 702 of side road is shown with a straight boundary 720 on one side, which may be a gradation that indicates a relatively high quality of driving of the vehicle 102. The third section 706 of side road is shown with a jagged boundary 722 on one side, which may be a gradation that indicates a relatively low quality of driving of the vehicle 102. The fifth section 710 of side road is shown with a curved boundary 724 on one side, which may be a gradation that indicates a relatively medium quality of driving of the vehicle 102. It will be understood that the boundaries 720, 722, and 724 are by way of example and for illustrative purposes only, and that suitable markers, lines, etc. may appear on both sides of a road on the example map 700, on the surface of a road on the example map 700, or in any other suitable manner. Other possible example types of gradations include numerical indications, displayed on the example map 700 on one or more roads traveled by the vehicle 102, of how much the vehicle 102 exceeded the speed limit on a road, a range of how much the vehicle 102 exceeded the speed limit on a road, indicating (e.g., with words, color, or any other suitable indication) whether the vehicle 102 exceeded the speed limit or not, etc. It will be understood from the teaching and disclosure herein that gradations for indications of the quality of the driving of the vehicle 102 other than indications related to applicable speed limits may also be used. It will also be understood that the hatched lines shown in FIG. 7 may be for explanatory purposes only—that is, to explain herein the roads on which the vehicle 102 travels—and may not actually be present on the map 700 during carrying out of the various actions described herein, as the map 700 may sufficiently indicate such roads by way of, for example, the gradations discussed herein.

With reference to the discussion above, the example map 700 may include one or more segments corresponding to the trip. Segmentation of the map 700, and thus locations of the individual segments, may be determined during (or after) driving of the vehicle 102 as (or after) determinations of quality of the driving of the vehicle 102 are made. In the example of FIG. 7, a first segment of the trip may be demarcated by segment boundaries 726 and 728. A second segment of the trip may be demarcated by the segment boundary 728 and a segment boundary 730. A third segment of the trip may be demarcated by the segment boundary 730 and a segment boundary 732. A fourth segment of the trip, which may end with entry of the vehicle 102 onto the state route 712, may be demarcated by the segment boundary 732 and a segment boundary 734. A fifth segment of the trip, which may end with entry of the vehicle 102 onto the interstate 718 by way of the first ramp 714, may be demarcated by the segment boundary 734 and a segment boundary 736. A sixth segment of the trip may be demarcated by the segment boundary 736 and a segment boundary 738. The segment boundary 738 is shown on a portion of the interstate 718 that is at the edge of the map 700, and it will be understood that the driving of the vehicle 102 during the trip including the aforementioned six segments may continue beyond the six segments shown in FIG. 7. In embodiments where a map does show the end of the trip, a pin or other suitable indicator may be placed at the location corresponding to the end of the trip upon receipt of an indication of the location corresponding to the end of the trip (e.g., via a user interface).

With further reference to the discussion above, pins or other suitable indicators may be placed on the example map 700 to indicate, for example, presence of restricted speed areas such as school zones; presence of any other areas where the driver 126 and/or driving instructor 136, for example, wishes to modify the desired speed with respect to the applicable speed limit; areas where the driving instructor 136 applied braking to the vehicle 102; etc. Two example pins that may demarcate, for example, a school zone, multiple instances of driving instructor braking 136, or any other suitable occurrence are shown on the example map 700 as a first pin 740 and a second pin 742 on the state route 712. The placement of such pins may be used by, for example, an application executing on the mobile device 130 to determine the at least one indication of the quality of the driving of the vehicle 102 based on a modification indicated by such placement. In some examples, the driver 126 or the driving instructor 136, for example, may input information via a user interface indicating the meaning of a pin or pins when such a pin or pins is/are placed, such as information indicating that a particular pin corresponds to braking applied by the driving instructor 136. In other examples, one or more pins may be placed on the example map 700 before the driving of the vehicle 102, or before the vehicle 102 reaches the location of the one or more pins, to designate, for an example, a location at which the driver 126, the driving instructor 136, and/or the insurance provider desires that the driving of the vehicle 102 be improved. In such examples, the driving instructor 136 may place one or more pins using the mobile device 130, the computing device 140, or the wearable computing device 142, for example; placement of one or more pins by the driver 126 may be performed using the mobile device 130, for example; and placement of one or more pins by the insurance provider may be performed using the insurance provider server 144, for example. Generally speaking, one or more pins may be placed on a map or other suitable indicator of a trip, such as the example map 700, for any suitable reason.

The example map 700 may be used to draw attention of the driver 126, the driving instructor 136, and/or the insurance provider to areas of the trip, or segments in embodiments where the example map 700 is segmented (e.g., when the driver 126, the driving instructor 136, and/or the insurance provider selects an option through a user interface to segment the trip so that, for example, one or more segments can later be selected for review), that need driver improvement. For example, one or more segments in which speed varies significantly, speed is in excess of the applicable speed limit, etc., may be designated (e.g., by way of gradations, pins enclosing such segments, other suitable indications presented via a user interface such as the example user interface described below with respect to FIG. 8, etc.) for review.

As noted above, the entire trip or one or more selected segments (e.g., selected through a user interface) may be played back via a user interface for view by the driver 126, the driving instructor 136, and/or the insurance provider. In one example, such playback may include showing an icon representing the vehicle 102 traveling along the route or the one or more selected segments, with gradation applied, if desired, to the portion of the route on which the vehicle 102 is presently shown (or to the entire route or any suitable portion thereof). Such playback may also or alternatively include showing an actual speed of the vehicle 102, a speed limit applicable to the location of the vehicle 102, a score or other quality metric as discussed above, a particular portion(s) or segment(s) noted for review (which notation may be done by way of, for example, a gradation indicating relatively low quality of driving), and/or any other suitable features. Various embodiments in which the trip or a segment(s) are played back are described in further detail below with respect to FIG. 8.

In some embodiments, as also further described below, one or more segments may be selected for play back by selecting time segments instead of selecting length/distance-based segments corresponding to segments shown on a map such as the example map 700. The example map 700 may or may not be presented via a user interface in such embodiments. Indeed, as a general matter, the example map 700 need not be accessible during the described playback. Instead, in some embodiments, information such as speed, speed limit, score, portion(s) or segment(s) noted for review, etc. may be shown. In some embodiments, actual video playback of the driving of the vehicle 102 (e.g., by use of the camera 134) may also or alternatively be shown.

VII. Example User Interface Corresponding to Driving of a Vehicle

Figure 8:
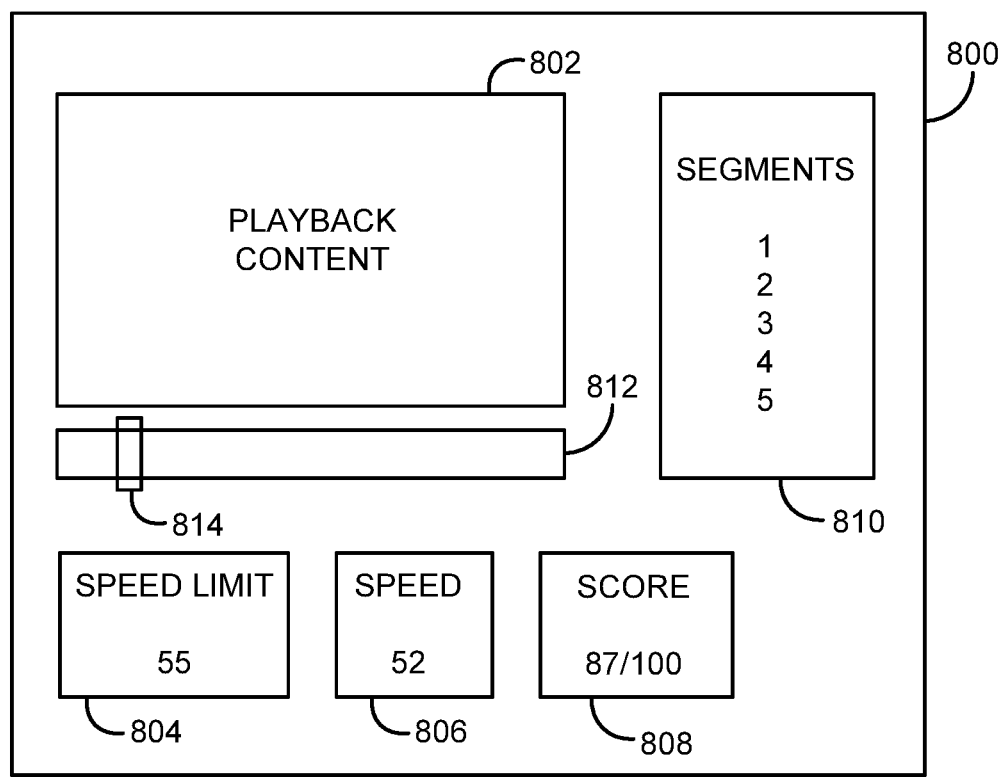
FIG. 8 illustrates an example user interface corresponding to driving of a vehicle.

FIG. 8 illustrates an example user interface 800 corresponding to driving of a vehicle, such as the vehicle 102. With reference to the discussion above, and as further described below, in some embodiments, a map such as the example map 700 may be used in conjunction with and/or as part of the example user interface 800. The example user interface 800 may be presented using the mobile device 130, the computing device 140, and/or the wearable computing device 142, for example, depending upon the desired implementation and/or to which parties (e.g., the driver 126, the driving instructor 136, and/or the insurance provider) are to receive the information made available via the example user interface 800.

The example user interface 800 may include a display region 802, a driving condition information region 804, a driving metric information region 806, a quality of driving information region 808, a menu region 810, a playback progress bar 812, and a playback adjuster 814. The display region 802 may display, in some examples, a map such as the example map 700. The example map 700 may be displayed before, during, and/or after the drive, and with reference to the discussion above may be updated during and/or after the drive. For example, gradations may be updated during and/or after the drive, segmentation may be updated during and/or after the drive, portions and/or segments of the trip may be identified for review by the driver 126, the driving instructor 136, and/or the insurance company after the drive, etc. Portions or segments of the example map 700, or the entire trip, may be played back in response to a suitable command, such as a touch input (an option corresponding to such a touch input not being shown in FIG. 8), provided to the display region 802, the menu region 810, etc.

With reference to the discussion above, the playback of a portion(s), segment(s), or entire trip may include showing the at least one driving condition in the driving condition information region 804. In the example of FIG. 8, the driving condition information region 804 shows that a speed limit (e.g., for an applicable section of road, which may be a section of road on which an icon representing the vehicle 102 is located) is 55 miles per hour. The playback may also include showing the at least one driving metric in the driving metric information region 806. In the example of FIG. 8, the driving metric information region 806 shows that a speed of the vehicle 102 (e.g., for the same portion of road for which the speed limit is shown) is 52 miles per hour. Other information may also or alternatively be presented in the driving condition information region 804 and the driving metric information region 806, such as information regarding other driving conditions and other driving metrics discussed herein.

The playback may also include showing the at least one indication of the quality of the driving of the vehicle 102 in the quality of driving information region 808. In the example of FIG. 8, an overall score for the trip is shown, such as 87 points out of a maximum of 100. For example, driving during previous portions of the trip may have exceeded the speed limit; driving during previous portions of the trip and/or the current portion of the trip may have other issues needing to be addressed, such as too much variation in speed, poor reaction time, etc.; and/or various other aspects of the driving of the vehicle 102 may cause the score to be 87 points.

Additionally, as noted above, other quality metrics for the driving of the vehicle 102 may also or alternatively be used, and may also or alternatively be displayed in the quality of driving information region 808, such as, for example, a metric(s) indicative of how much the vehicle 102 unnecessarily varied in speed/deviated from posted speed limits, a metric(s) indicative of reaction time, etc. Moreover, gradations of the quality of the driving, whether presented in the display region 802 or not, may also or alternatively be displayed or indicated in the quality of driving information region 808. For example, the quality of driving information region 808 may display the word "RED" to indicate that a gradation of the quality of driving is red (e.g., relatively poor) for the current portion or segment of the trip. In some embodiments, selection of information to be displayed in the quality of driving information region 808 may be performed by selection via a suitable menu (not shown in FIG. 8), within which selections may be made by, for example, touch input. The menu may include, for example, one or more icons in the quality of driving information region 808, the menu region 810, the display region 802, etc. It will be appreciated from the teaching and disclosure herein that the information in the regions 804, 806, and 808, among other regions, may be updated during playback, such as to indicate changing speed, changing speed limit, changing score, etc.

It will also be appreciated that in the illustrated example, the score of 87 points may be a cumulative score for the trip, though in other examples, the score may reflect current driving (e.g., an instantaneous or essentially instantaneous score based on current information, a score based on a current segment, etc.) and not previous driving during the trip. In embodiments where the score (or another quality metric) is cumulative, the score or quality metric may be based on any suitable weighing or accounting of a driving condition(s), driving metric(s), etc., such as, for example, amounts of time spent in particular ranges above a speed limit, types of roads on which speeding occurred, etc. Other considerations may also be accounted for, such as an insurance claim history of the driver 126, where if desired, a relatively higher number of claims may cause relatively poor driving to more quickly have a negative impact on the score or other quality metric.

In some embodiments, the playback, whether by way of displaying the example map 700 (e.g., with an icon representing the vehicle 102 moving along the route driven), displaying actual video of the driving of the vehicle 102 (e.g., as captured by the camera 134 as discussed above), or presenting any other suitable content in the display region 802, may have its progress indicated by the position of the playback adjuster 814 on the playback progress bar 812, with the left edge of the playback progress bar 812 corresponding to the beginning of the associated playback and the right edge of the playback progress bar 812 corresponding to the end of the associated playback. Moreover, the position of the playback adjuster 814—and thus the part of the trip, portion of the trip, or segment being played back—may itself be adjusted by a suitable user input, such as a touch input to drag or otherwise move the position of the playback adjuster 814 across the playback progress bar 812 in either direction.

The menu region 810 may include any suitable information for presentation to, for example, the driver 126, the driving instructor 136, and/or the insurance provider; any suitable selectable option(s); and/or any other suitable content to allow access to information available through the example user interface 800 and to allow navigation through the example user interface 800. In the example of FIG. 8, the menu region 810 includes a list of segment numbers; namely, segments 1-5. These segment numbers may correspond to, for example, the first five segments identified on a corresponding map, such as the example map 700. In another embodiment, times of the driving trip—where a time of zero hours, zero minutes, and zero seconds may, for example, correspond to the start of the driving trip—that correspond to the start of different segments may also or alternatively be displayed in the menu region 810 for selection (not shown in FIG. 8). In general, segments of the trip may be identified in any suitable manner for selection. In still another embodiment, and with reference to the discussion above, segments (or the entire trip) identified as desirable or necessary for review may also or alternatively be identified (in the case of segments, by segment number, by elapsed trip time, etc.) in the menu region 810. A trip or segment(s) may also be identified for review in the display region 802.

It will be appreciated from the teaching and disclosure herein that by providing the described embodiments of a system and method that allow determining a quality of driving of a vehicle, various advantages are achieved. Among other advantages, for example, the at least one driving condition information indicating device provides information particularly suited for use in concert/in conjunction with other features of the system and method to determine at least one indication of the quality of the driving of the vehicle. Additionally, the at least one indication of the quality of the driving of the vehicle may be advantageously provided in any of a number of suitable ways in greater detail and/or in a more usable form as compared to conventional methods. As just one example, a speed-related indication of the quality of the driving may be provided to a driving instructor without the need for the driving instructor to, for example, look at the speedometer of the vehicle. More generally, as noted above, the inclusion of at least the receipt of information indicating the at least one driving condition from the at least one driving condition information indicating device improves the nature of determining a quality of driving of a vehicle. Other advantages will be recognized by one of ordinary skill in the art in light of the teaching and disclosure herein.

VIII. Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the mobile device 130, the computing device 140, the wearable computing device 142, and/or any other computing devices within the example system 100 in any suitable combination). The routines may be included as part of any of the modules described in relation to FIG. 1 or as part of a module that is external to the system illustrated by FIG. 1. For example, the methods or portions thereof may be part of a browser application(s) or an application(s) running on any of the devices in the example system 100 as a plug-in or other module of the browser application. Further, the methods may be employed as "software-as-a-service" to provide, for example, the mobile device 130, the computing device 140, the wearable computing device 142, and/or any other computing devices with access to the example system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of an example system 100 and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for determining a quality of driving of a vehicle. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention.

It is therefore intended to cover in the appended claims all such changes and modifications that are within the scope of this invention.

What is claimed is:

1. A computer-implemented method for determining a quality of driving of a vehicle, the method comprising:
    receiving, using one or more processors via a computer network, from at least one driving condition information indicating device, information indicating at least one driving condition, the at least one driving condition being different from each of a plurality of driving metrics associated with the driving of the vehicle and affecting a relationship between the quality of the driving of the vehicle and at least one driving metric of the plurality of driving metrics associated with the driving of the vehicle, and wherein the at least one driving condition includes a current traffic density during a particular trip determined by analyzing crowd-sourced data indicative of a location or a speed of one or more vehicles proximate to the vehicle;
    adjusting, using the one or more processors, a threshold following distance between the vehicle and a forward vehicle based on the current traffic density, wherein the threshold following distance is included in the at least one driving condition;
    receiving, using the one or more processors, information indicating the at least one driving metric associated with the driving of the vehicle during the particular trip, the at least one driving metric including a measured following distance between the vehicle and the forward vehicle;
    determining, using the one or more processors, at least one indication of the quality of the driving of the vehicle during the particular trip based on the information indicating the at least one driving metric and based on the received information from the at least one driving condition information indicating device;
    receiving, using the one or more processors, at least one of an adjustment from at least one of the driver or the driving instructor to the information indicating the at least one driving condition or an adjustment from at least one of the driver or the driving instructor to the information indicating the at least one driving metric, wherein the at least one of the driver or driving instructor performs the adjustment by placing at least one indicator on a map provided within a user interface; and
    providing, using the one or more processors, the at least one indication of the quality of the driving of the vehicle to at least one of the driver, a driving instructor present in the vehicle during the driving of the vehicle by the driver, or an insurance provider providing insurance coverage with respect to at least one of the vehicle or the driver, wherein the at least one indication of the quality of the driving of the vehicle is provided within the user interface, and wherein the user interface is configured to playback at least one segment of the particular trip.

2. The computer-implemented method of claim 1, wherein receiving the information indicating the at least one driving condition comprises receiving, using the one or more processors via the computer network, from the at least one driving condition information indicating device, information indicating at least one speed limit on at least one road on which the driving of the vehicle occurs, and wherein determining the at least one indication of the quality of the driving of the vehicle comprises determining, using the one or more processors, information indicating at least one of: (i)

whether a speed of the driving of the vehicle exceeds a corresponding speed limit of the at least one speed limit, the corresponding speed limit of the at least one speed limit being applicable to at least one portion of the driving of the vehicle, (ii) at least one amount by which the speed of the driving of the vehicle exceeds the corresponding speed limit of the at least one speed limit, or (iii) at least one amount of time during which the speed of the driving of the vehicle exceeds the corresponding speed limit of the at least one speed limit.

3. The computer-implemented method of claim 1, wherein providing the at least one indication of the quality of the driving of the vehicle comprises providing, using the one or more processors, to at least one of the driver or the driving instructor, at least one of: (i) an ability to review all of the driving of the vehicle during a particular trip, or (ii) an ability to select one or more segments of the particular trip with respect to which to review the driving of the vehicle.

4. The computer-implemented method of claim 3, wherein providing the at least one of the ability to review all of the driving of the vehicle during the particular trip or the ability to select the one or more segments of the particular trip with respect to which to review the driving of the vehicle comprises providing, using the one or more processors, an ability to review, at different times during at least one of all of the driving of the vehicle during the particular trip or the one or more selected segments of the particular trip, at least one of the at least one driving metric or at least a portion of the information indicating the at least one driving condition.

5. The computer-implemented method of claim 1, wherein determining the at least one indication of the quality of the driving of the vehicle comprises determining, using the one or more processors, at least one gradation of the quality of the driving of the vehicle, each one of the at least one gradation of the quality of the driving of the vehicle indicating the quality of the driving of the vehicle relative to the quality of the driving of the vehicle as indicated by a different gradation of the quality of the driving of the vehicle.

6. The computer-implemented method of claim 1, wherein receiving the information indicating the at least one driving metric associated with the driving of the vehicle comprises receiving, using the one or more processors, information indicating at least one of: (i) a speed of the driving of the vehicle, or (ii) a degree of braking applied by the driver during the driving of the vehicle.

7. The computer-implemented method of claim 1, wherein receiving the information indicating the at least one driving condition comprises receiving, using the one or more processors via the computer network, from the at least one driving condition information indicating device, information indicating at least one of: (i) whether another vehicle is in front of the vehicle during the driving of the vehicle, (ii) an amount of traffic on a road on which the driving of the vehicle occurs, (iii) a speed of another vehicle during the driving of the vehicle, (iv) a type of road on which the driving of the vehicle occurs, (v) a speed limit on a road on which the driving of the vehicle occurs, (vi) a restriction associated with a speed limit on a road on which the driving of the vehicle occurs, (vii) a weather condition associated with a road on which the driving of the vehicle occurs, (viii) visibility associated with a road on which the driving of the vehicle occurs, (ix) a traffic prompt associated with a road on which the driving of the vehicle occurs, or (x) a capability of the driver.

8. The computer-implemented method of claim 1, wherein determining the at least one indication of the quality of the driving of the vehicle comprises determining, using the one or more processors, information indicating at least one of: (i) whether a speed of the driving of the vehicle exceeds a speed limit applicable to at least one portion of the driving of the vehicle, (ii) whether a speed of the driving of the vehicle is below a speed limit applicable to at least one portion of the driving of the vehicle by at least a threshold amount, (iii) an amount by which a speed of the driving of the vehicle one of exceeds or is below a speed limit applicable to at least one portion of the driving of the vehicle, (iv) an amount of time during which a speed of the driving of the vehicle one of exceeds or is below a speed limit applicable to at least one portion of the driving of the vehicle, or (v) a variation in a speed of the driving of the vehicle within a particular amount of time.

9. The computer-implemented method of claim 1, wherein providing the at least one indication of the quality of the driving of the vehicle further comprises providing, using the one or more processors, at least one of: (i) at least one quality metric for all of the driving of the vehicle during a particular trip, (ii) at least one quality metric for the driving of the vehicle during at least one segment of a plurality of segments of the particular trip, (iii) at least one gradation of the quality of the driving of the vehicle for all of the driving of the vehicle during the particular trip, or (iv) at least one gradation of the quality of the driving of the vehicle during at least one segment of a plurality of segments of the particular trip.

10. The computer-implemented method of claim 1, the at least one indication of the quality of the driving of the vehicle being provided to the insurance provider so as to allow the insurance provider to determine at least one of a rating or a premium adjustment to apply to the insurance coverage provided by the insurance provider with respect to the at least one of the vehicle or the driver.

11. The computer-implemented method of claim 1, further comprising providing, using the one or more processors, at least one of: (i) at least one indication of the at least one driving condition via a user interface of a mobile device, the mobile device being present in the vehicle during the driving of the vehicle, (ii) at least one indication of the at least one driving metric via the user interface of the mobile device, or (iii) the at least one indication of the quality of the driving of the vehicle via the user interface of the mobile device.

12. The computer-implemented method of claim 11, the user interface providing output to the driving instructor during the driving of the vehicle by the driver so that the providing of the at least one of the at least one indication of the at least one driving condition, the at least one indication of the at least one driving metric, or the at least one indication of the quality of the driving of the vehicle via the user interface of the mobile device comprises providing the at least one of the at least one indication of the at least one driving condition, the at least one indication of the at least one driving metric, or the at least one indication of the quality of the driving of the vehicle via a user interface to the driving instructor during the driving of the vehicle by the driver.

13. A computer device for determining a quality of driving of a vehicle, the computer device comprising:
 one or more processors; and
 one or more memories coupled to the one or more processors, the one or more memories including non-transitory computer executable instructions stored therein that, when executed by the one or more processors, cause the one or more processors to:

receive, from at least one driving condition information indicating device, information indicating at least one driving condition, the at least one driving condition being different from each of a plurality of driving metrics associated with the driving of the vehicle and affecting a relationship between the quality of the driving of the vehicle and at least one driving metric of the plurality of driving metrics associated with the driving of the vehicle, and wherein the at least one driving condition includes a current traffic density during a particular trip determined by analyzing crowd-sourced data indicative of a location or a speed of one or more vehicles proximate to the vehicle;

adjust a threshold following distance between the vehicle and a forward vehicle based on the current traffic density, wherein the threshold following distance is included in the at least one driving condition;

receive information indicating the at least one driving metric associated with the driving of the vehicle during the particular trip, the at least one driving metric including a measured following distance between the vehicle and the forward vehicle;

determine at least one indication of the quality of the driving of the vehicle during the particular trip based on the information indicating the at least one driving metric and based on the received information from the at least one driving condition information indicating device;

receive at least one of an adjustment from at least one of the driver or the driving instructor to the information indicating the at least one driving condition or an adjustment from at least one of the driver or the driving instructor to the information indicating the at least one driving metric, wherein the at least one of the driver or driving instructor performs the adjustment by placing at least one indicator on a map provided within a user interface; and provide the at least one indication of the quality of the driving of the vehicle to at least one of the driver, a driving instructor present in the vehicle during the driving of the vehicle by the driver, or an insurance provider providing insurance coverage with respect to at least one of the vehicle or the driver, wherein the at least one indication of the quality of the driving of the vehicle is provided within the user interface, and wherein the user interface is configured to playback at least one segment of the particular trip.

14. The computer device of claim 13, the one or more memories further including non-transitory computer executable instructions that when executed cause the one or more processors to determine the at least one indication of the quality of the driving of the vehicle by determining information indicating at least one of: (i) whether a speed of the driving of the vehicle exceeds a speed limit applicable to at least one portion of the driving of the vehicle, (ii) whether a speed of the driving of the vehicle is below a speed limit applicable to at least one portion of the driving of the vehicle by at least a threshold amount, (iii) an amount by which a speed of the driving of the vehicle one of exceeds or is below a speed limit applicable to at least one portion of the driving of the vehicle, (iv) an amount of time during which a speed of the driving of the vehicle one of exceeds or is below a speed limit applicable to at least one portion of the driving of the vehicle, or (v) a variation in a speed of the driving of the vehicle within a particular amount of time.

15. The computer device of claim 13, the at least one indication of the quality of the driving of the vehicle being provided to the insurance provider so as to allow the insurance provider to determine at least one of a rating or a premium adjustment to apply to the insurance coverage provided by the insurance provider with respect to the at least one of the vehicle or the driver.

16. A computer readable storage medium comprising non-transitory computer readable instructions stored thereon for determining a quality of driving of a vehicle, wherein the instructions when executed on one or more processors cause the one or more processors to:

receive, from at least one driving condition information indicating device, information indicating at least one driving condition, the at least one driving condition being different from each of a plurality of driving metrics associated with the driving of the vehicle and affecting a relationship between the quality of the driving of the vehicle and at least one driving metric of the plurality of driving metrics associated with the driving of the vehicle, and wherein the at least one driving condition includes a current traffic density during a particular trip determined by analyzing crowd-sourced data indicative of a location or a speed of one or more vehicles proximate to the vehicle;

adjust a threshold following distance between the vehicle and a forward vehicle based on the current traffic density, wherein the threshold following distance is included in the at least one driving condition;

receive information indicating the at least one driving metric associated with the driving of the vehicle during the particular trip, the at least one driving metric including a measured following distance between the vehicle and the forward vehicle;

determine at least one indication of the quality of the driving of the vehicle during the particular trip based on the information indicating the at least one driving metric and based on the received information from the at least one driving condition information indicating device;

receive at least one of an adjustment from at least one of the driver or the driving instructor to the information indicating the at least one driving condition or an adjustment from at least one of the driver or the driving instructor to the information indicating the at least one driving metric, wherein the at least one of the driver or driving instructor performs the adjustment by placing at least one indicator on a map provided within a user interface; and provide the at least one indication of the quality of the driving of the vehicle to at least one of the driver, a driving instructor present in the vehicle during the driving of the vehicle by the driver, or an insurance provider providing insurance coverage with respect to at least one of the vehicle or the driver, wherein the at least one indication of the driving of the vehicle is provided within the user interface, and wherein the user interface is configured to playback at least one segment of a particular trip.

17. The computer readable storage medium of claim 16, wherein the non-transitory computer readable instructions that when executed cause the one or more processors to provide the at least one indication of the quality of the driving of the vehicle cause the one or more processors to provide the at least one indication of the quality of the driving of the vehicle by providing, to at least one of the driver or the driving instructor, at least one of: (i) an ability to review all of the driving of the vehicle during a particular trip, including an ability to review at least one of the at least one driving metric or at least a portion of the information indicating the at least one driving condition, or (ii) an ability to review the driving of the vehicle during one or more segments of the particular trip, including the ability to review the at least one of the at least one driving metric or the at least the portion of the information indicating the at least one driving condition.

18. The computer readable storage medium of claim 16, wherein the non-transitory computer readable instructions that when executed cause the one or more processors to determine the at least one indication of the quality of the driving of the vehicle cause the one or more processors to determine the at least one indication of the quality of the driving of the vehicle by determining information indicating at least one of: (i) whether a speed of the driving of the vehicle exceeds a speed limit applicable to at least one portion of the driving of the vehicle, (ii) whether a speed of the driving of the vehicle is below a speed limit applicable to at least one portion of the driving of the vehicle by at least a threshold amount, (iii) an amount by which a speed of the driving of the vehicle one of exceeds or is below a speed limit applicable to at least one portion of the driving of the vehicle, (iv) an amount of time during which a speed of the driving of the vehicle one of exceeds or is below a speed limit applicable to at least one portion of the driving of the vehicle, or (v) a variation in a speed of the driving of the vehicle within a particular amount of time.

19. The computer readable storage medium of claim 16, the at least one indication of the quality of the driving of the vehicle being provided to the insurance provider so as to allow the insurance provider to determine at least one of a rating or a premium adjustment to apply to the insurance coverage provided by the insurance provider with respect to the at least one of the vehicle or the driver.

* * * * *